United States Patent [19]
Funada et al.

[11] Patent Number: 5,847,849
[45] Date of Patent: Dec. 8, 1998

[54] IMAGE PROCESSOR APPARATUS CAPABLE OF UPDATING REFERENCE DATA FOR DETERMINING SIMILARITY BETWEEN FEATURES

[75] Inventors: Masahiro Funada, Yokohama; Ken-Ichi Ohta, Kawasaki; Yutaka Udagawa, Machida; Yoichi Takaragi, Yokohama; Eiji Ohta, Fujisawa, all of Japan

[73] Assignee: Canon Kabushiki Kaisha, Tokyo, Japan

[21] Appl. No.: 339,874

[22] Filed: Nov. 10, 1994

Related U.S. Application Data

[63] Continuation of Ser. No. 907,319, Jul. 1, 1992, abandoned.

[30] Foreign Application Priority Data

| Jul. 1, 1991 | [JP] | Japan | 3-160380 |
| Jul. 1, 1991 | [JP] | Japan | 3-160387 |

[51] Int. Cl.⁶ .............. H04N 1/46; G06K 9/00; G03G 21/00
[52] U.S. Cl. .......... 358/530; 382/135; 399/366
[58] Field of Search .............. 382/30, 34, 135, 382/136, 165; 380/23, 24, 25, 18, 3; 235/379, 380; 379/62; 364/918, 255.7, 413.02; 902/4, 5, 24, 25, 28; 355/201; 358/500, 501, 530, 538; 434/110; 399/366

[56] References Cited

U.S. PATENT DOCUMENTS

| 4,962,457 | 10/1990 | Chen et al. | 364/443 |
| 5,055,834 | 10/1991 | Chiba | 382/135 |
| 5,216,724 | 6/1993 | Suzuki et al. | 382/7 |
| 5,321,470 | 6/1994 | Hasuo et al. | 355/201 |
| 5,424,807 | 6/1995 | Ohmura | 355/201 |

FOREIGN PATENT DOCUMENTS

| 101276 | 5/1983 | European Pat. Off. ......... G07D 5/00 |
| 0101276 | 2/1984 | European Pat. Off. . |
| 0342060 | 11/1989 | European Pat. Off. . |
| 342060 | 12/1989 | European Pat. Off. ....... G03G 21/00 |
| 59-53980 | 3/1984 | Japan .............................. G06K 9/00 |
| 2182477 | 5/1987 | United Kingdom . |

Primary Examiner—Andrew I. Faile
Assistant Examiner—John W. Miller
Attorney, Agent, or Firm—Fitzpatrick, Cella, Harper & Scinto

[57] ABSTRACT

An image processor having a circuit for holding data on features of registered specific images, a circuit for determining the degree of similarity between features of an input image and the held features of each of the specific images, and a circuit for updating the held content of the holding circuit from the outside through a line. The image processor also has a judgment circuit for determining the degree of similarity between an input image and each of the specific images according to tint distributions of these images, and a circuit for registering data on the tint distribution of each specific image.

12 Claims, 22 Drawing Sheets

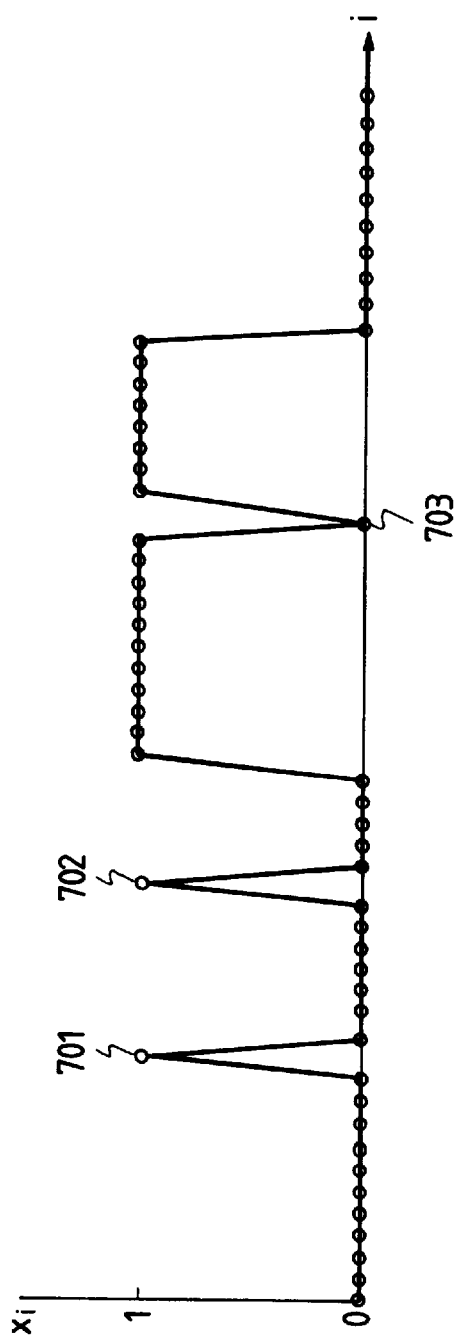
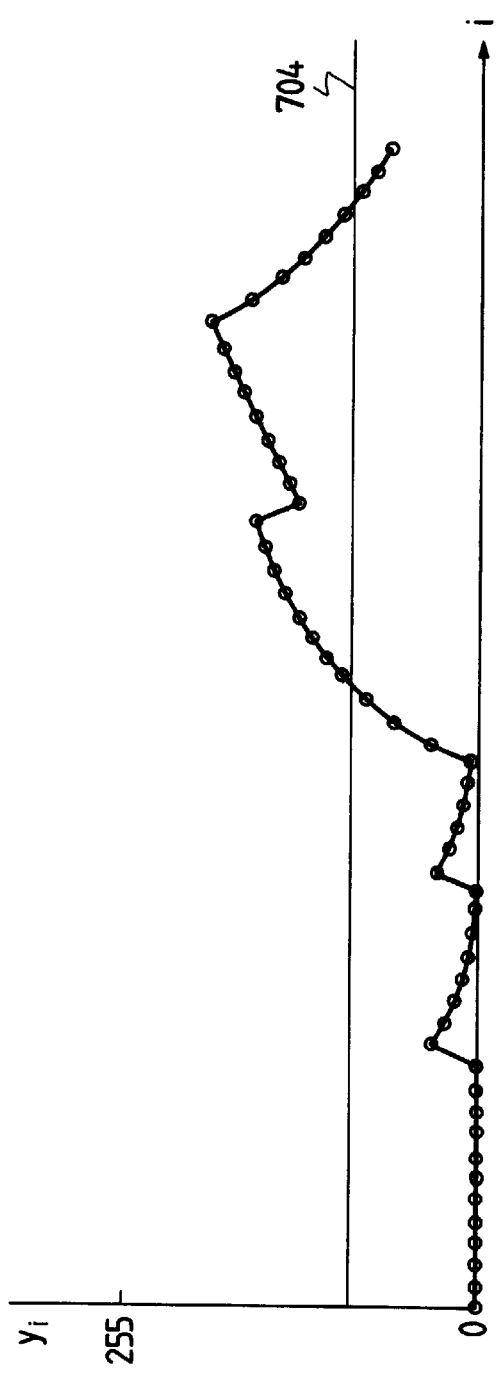
FIG. 7A
FIG. 7B

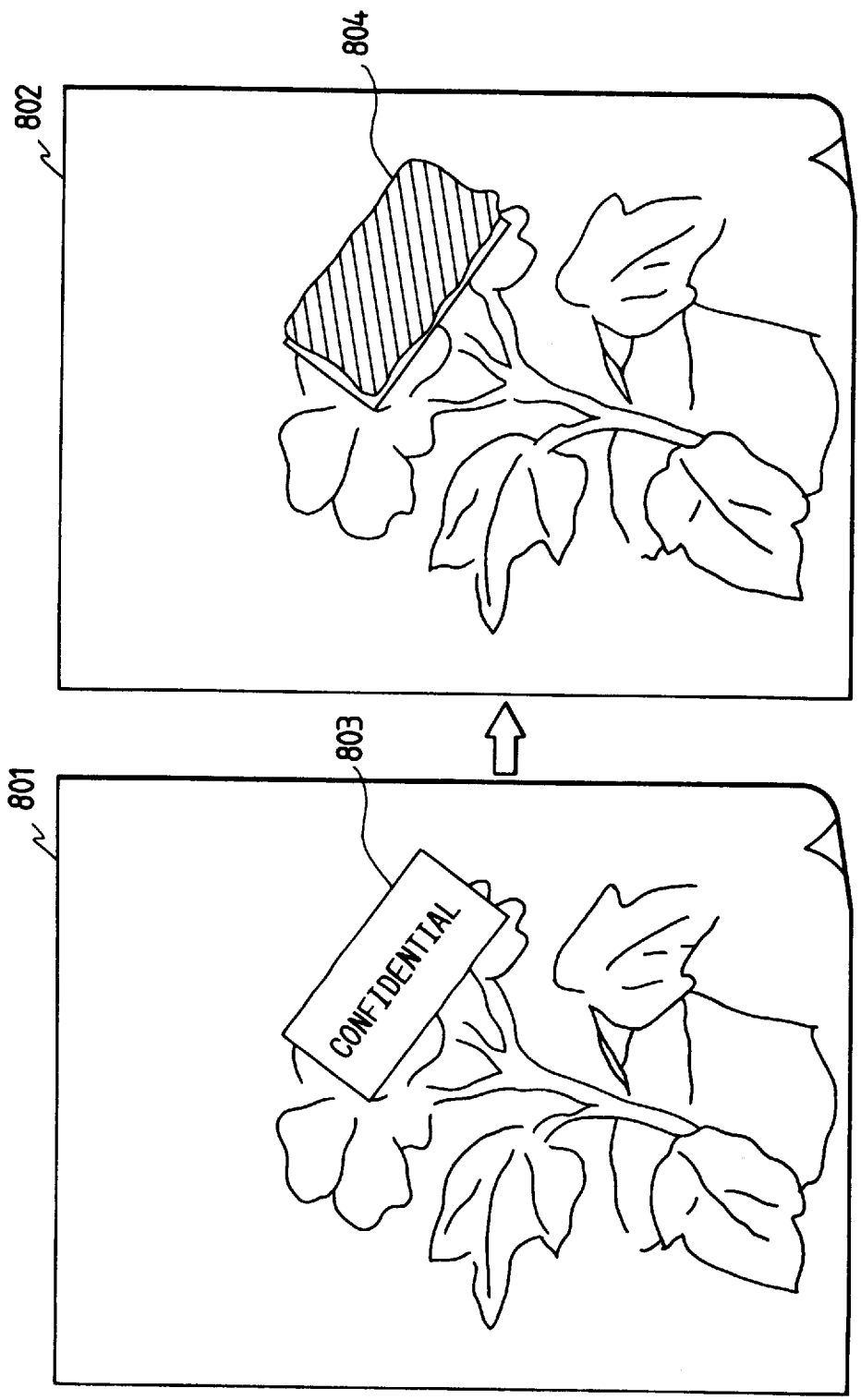

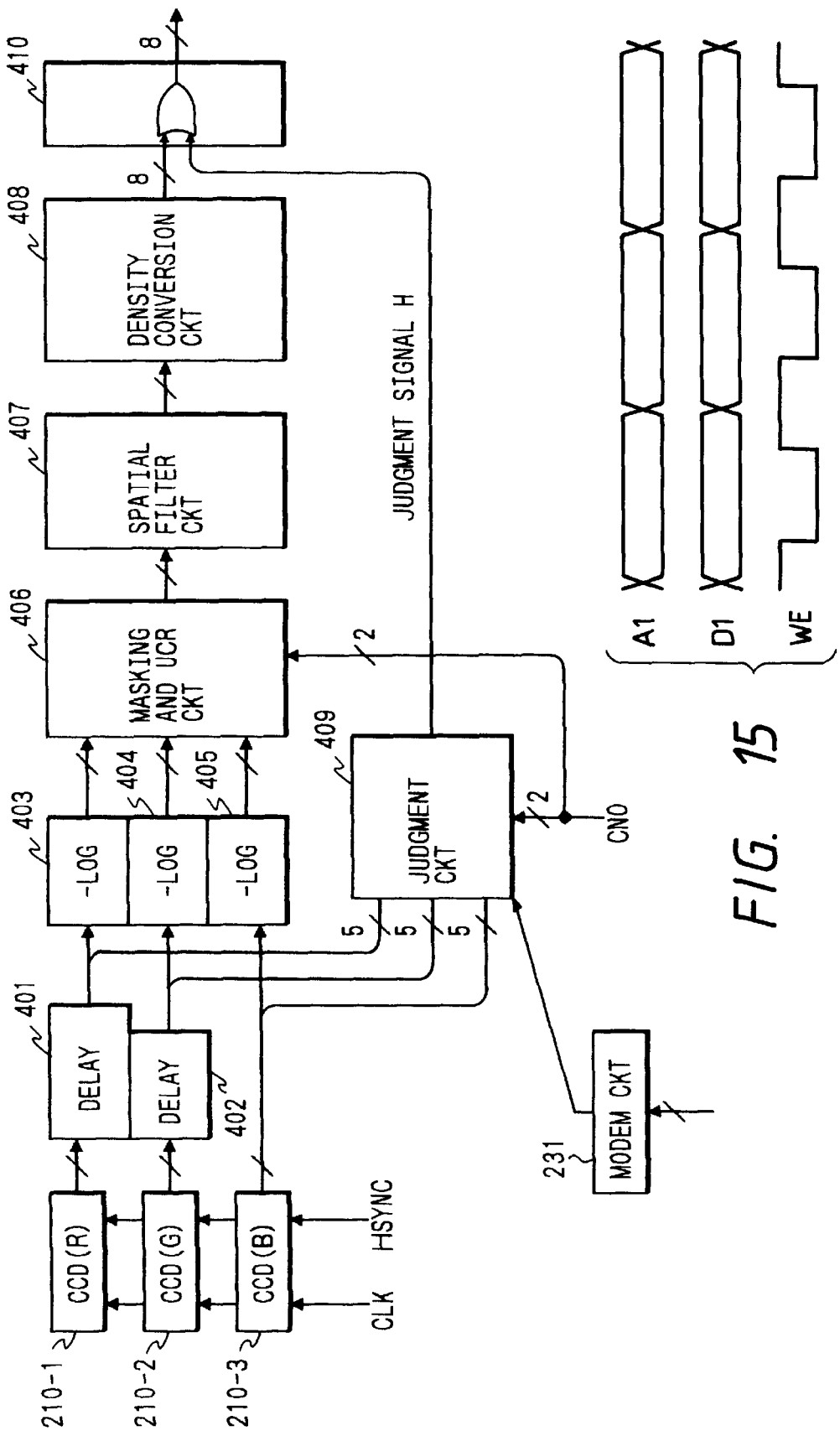

IMAGE PROCESSOR APPARATUS CAPABLE OF UPDATING REFERENCE DATA FOR DETERMINING SIMILARITY BETWEEN FEATURES

This application is a continuation-in-part of application Ser. No. 07/907,319, filed Jul. 1, 1992, now abandoned.

BACKGROUND OF THE INVENTION

1. Field of the Invention

This invention relates to an apparatus having a function of detecting a specific original.

2. Related Background Art

Recently, with the development of copying machines capable of forming a multi-color copy having high image qualities, a risk of forgery of specific originals which should not be copied has arisen.

Various types of image processors for use in copying machines have therefore been proposed which have a function of judging whether an original presented for copying in such a specific original, by storing in advance data on features on the specific original and comparing the data with the features of the input image (U.S. patent application Ser. No. 351,165 U.S. Pat. No. 5,216,724).

However, it is impossible for the conventional image processors to function suitably with respect to originals which should not be copied other than the registered specific originals, because the data on the features of the specific originals is fixedly stored in the processor. A technique of registering patterns of specific originals by converting input image data into binary data is disclosed in U.S. Pat. No. 5,424,807, but the performance of it is not all that might be desired since only binary data can be registered.

The same problem is encountered in the case of single printer units having a discrimination function other than the above-described copying machines or apparatuses having a function of discriminating security papers or the like.

As one technique for preventing an act of forging bank notes, securities, etc., a technique of registering in advance data on specific originals in an RGB color space and judging whether a color distribution of input image data coincides with one of the color distributions of the specific original data to discriminate the corresponding one of the specific originals, has been proposed by the assignee of the present invention, as disclosed in U.S. patent application Ser. No. 715,922 and U.S. Pat. Nos. 5,227,871 and 5,430,525.

More specifically, in accordance with this technique, distributions of red (R), green (G) and blue (B) signals of the data on an input original image in an RGB three-dimensional coordinate space corresponding distributions of a specific original in the three-dimensional coordinate space are compared, and, if the proportion of the matching part is greater than a certain value, it is determined that the original input to be copied contains the specific original in question.

In this process, it is necessary to register in advance tint distributions in the RGB color space of each of specific originals to be discriminated.

However, there are various specific originals which should not be copied, and the number and the kinds of such originals vary greatly with respect to countries, regions, occupations and the like in which the copying machine is used. Accordingly, it is impossible to register all the data on such originals in practice, and it is desirable that the copying machine can be operated in a simple manner to change the registered content or to newly register data according to the environment in which the machine is used.

SUMMARY OF THE INVENTION

An object of the present invention is to provide an image processor capable of registering data on a specific original to be discriminated.

To achieve this object, according to the present invention, there is provided an image processor comprising holding means for holding features of a registered specific original, means for determining a similarity between features of an input image and the held features of the specific original and updating means for updating the held content of the holding means from the outside through a line.

Another object of the present invention is to provide an image processor capable of updating data for determining the existence of a specific original based on a feature thereof relating to color information.

To achieve this object, according to the present invention, there is provided an image processor comprising holding means for holding features of a registered specific original relating to color information, means for determining a similarity between features of an input image relating to color information and the features held by the holding means and updating means for updating the held content of the holding means.

According to the present invention, in another aspect, there is provided an image processor comprising, judgment means for determining the degree of similarity between an input image and a specific original, and registration means for registering data on a distribution of a tint of the specific original.

Other objects and features of the present invention will become apparent from the following detailed description of the preferred embodiments of the invention based on the accompanying drawings.

BRIEF DESCRIPTION OF THE DRAWINGS

FIGS. 7A and 7B are diagrams of the timing of input and output signals in integrator 306;

FIG. 8 is a diagram of an example of the result of processing in accordance with the third embodiment;

FIG. 14 is a diagram of the fourth embodiment;

FIG. 15 is a diagram corresponding to the timing chart of FIG. 6.

DESCRIPTION OF THE PREFERRED EMBODIMENTS

[First Embodiment]

The present invention will be described below in detail with respect to the preferred embodiments thereof.

Copying machines will be described as embodiments of the present invention, but, needless to say, the present invention is not limited to them and can be applied to any other kind of apparatus.

[Outline of the processor]

Figure 2:
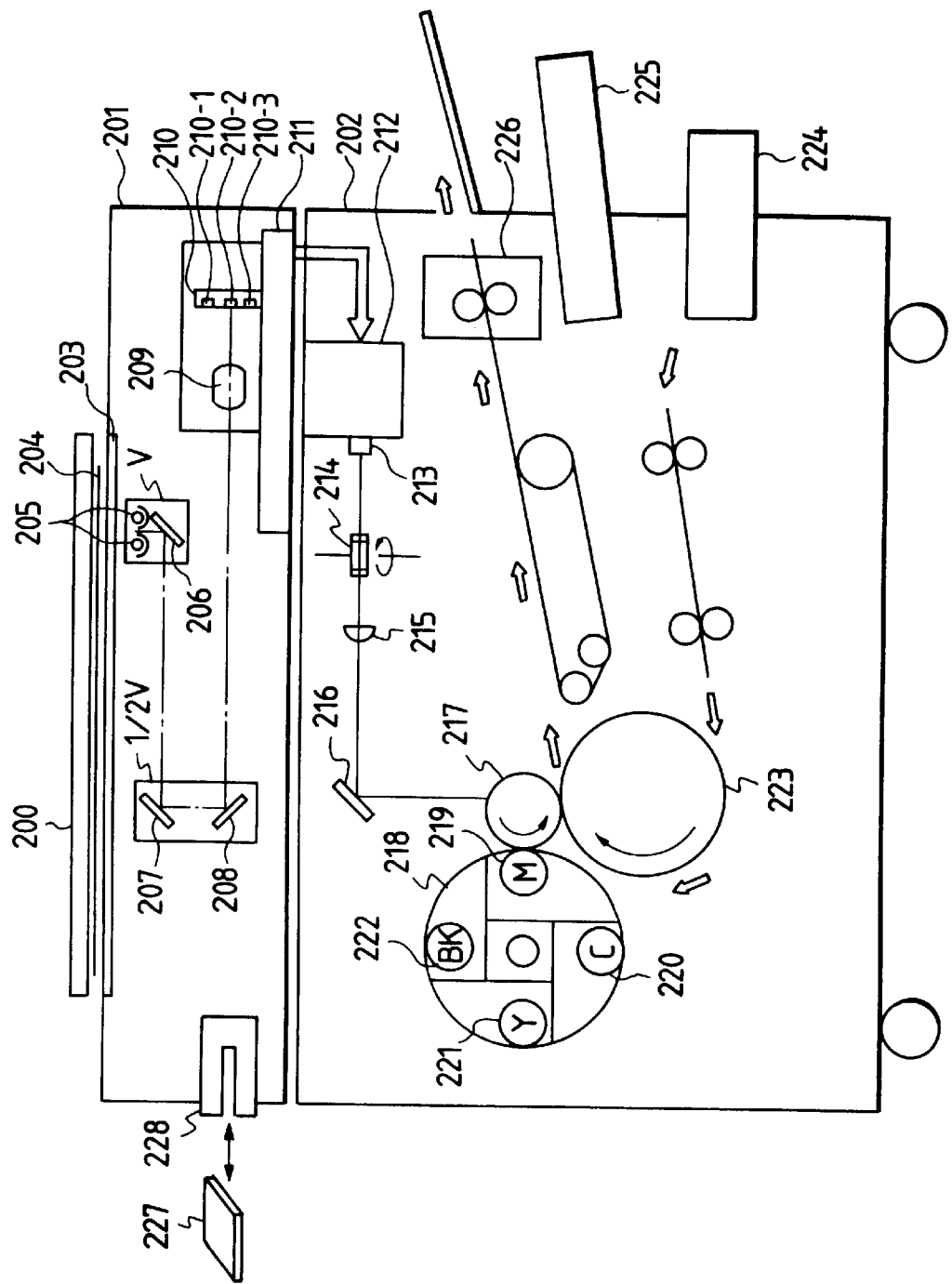
FIG. 2 is a schematic diagram of a copying machine in accordance with a first embodiment of the present invention.

FIG. 2 schematically illustrates a copying machine in accordance with the first embodiment of the present invention. In FIG. 2, a block 201 represents an image scanner unit which reads an original and performs digital signal processing. A block 202 represents a printer unit which prints, on a paper sheet, a full-color output image corresponding to an original image read by the image scanner 201.

In the image scanner 201, an original 204 is placed on an original table glass (hereinafter referred to as a platen) 203 while being pressed by a specular pressing plate 200. The original 204 on the platen 203 is irradiated with a lamp 205, and reflection light from the original travels via mirrors 206, 297, and 208 to form an image on a three-line sensor (hereinafter referred to as a CCD) 210 through a lens 209. Full-color information having a red (R) component, a green (G) component and a blue (B) component is thereby obtained and is sent to a signal processing section 211. The lamp 205 and the mirror 206 are mechanically moved at a speed v in a direction perpendicular to the direction of electrical scanning of the line sensor (the main scanning direction) and the mirrors 207 and 208 are also mechanically moved at a speed ½ v in the same direction to scan the surface of the original (in a sub scanning direction).

In the signal processing section 211, the read image signal is electrically processed to be decomposed into a magenta (M) component, a cyan (C) component, a yellow (Y) component, and a black (Bk) component to be sent to the printer unit 202. In one cycle of original scanning of the image scanner 201, one of the components M, C, Y, and Bk is sent to the printer unit 202. One print of the reproduced image is completed by four cycles of original scanning.

Each image signal M, C, Y or Bk sent from the image scanner unit 201 is sent to a laser driver 212. The laser driver 212 drives a semiconductor laser device 213 by modulating a driving signal. A surface of a sensitive drum 217 is scanned with laser light from the laser device led by a polygon mirror 214, an f-θ lens 215 and a mirror 216.

A rotary development device 218 has a magenta development section 219, a cyan development section 220, a yellow development section 221 and a black development section 222. These development sections are alternately brought into contact with the sensitive drum 217 to develop, with a toner, an electrostatic image formed on the sensitive drum.

A paper sheet supplied from a paper cassette 224 or 225 is wrapped around a transfer drum 223, and the image developed on the sensitive drum is transferred to the paper sheet.

After four colors M, C, Y and Bk have been successively transferred in this manner, the print sheet is passed through a fixation unit 226 and is discharged after the completion of fixation of the toner.

An IC card 227 is inserted into a card reader 228 incorporated in the image scanner 201 to transfer information stored in the IC card 227.

[Image Scanner]

Figure 1:
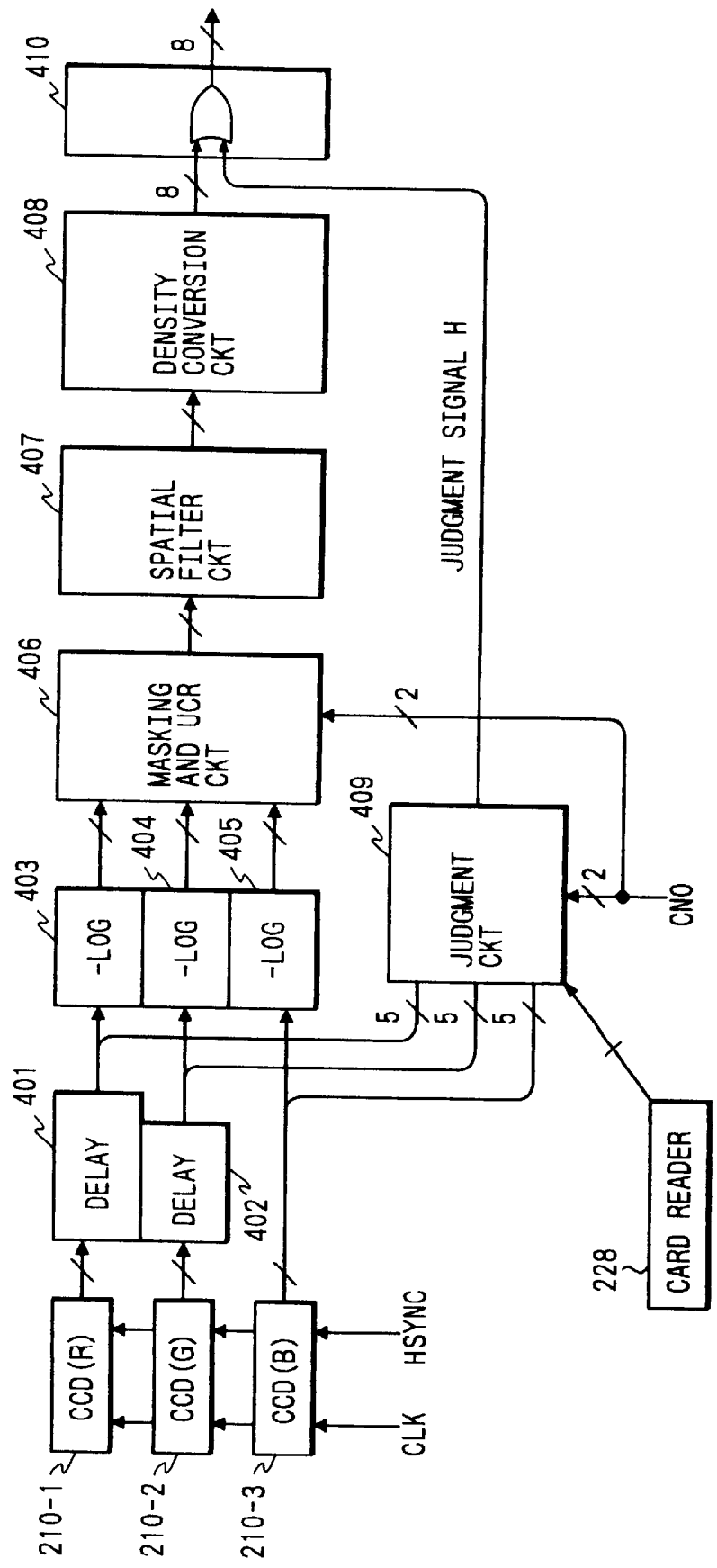
FIG. 1 is a block diagram of an image scanner unit.

FIG. 1 is a block diagram showing signal flow in the image scanner unit 201.

In FIG. 1, blocks 210-1, 210-2, and 210-3 represent CCD sensors (solid image pick-up elements) having spectroscopic sensitivity characteristics such as to be sensitive to red (R), green (G) and blue (B), respectively. Each sensor converts an analog input into an 8-bit per pixel signal having a value of 0 to 255 and outputs this signal.

The sensors 210-1, 210-2, and 210-3 used in accordance with this embodiment are disposed at certain distances from each other, and relative spatial deviations thereof are corrected by delay elements 401 and 402.

Blocks 403, 404, and 405 represent logarithmic converters which are constituted of look-up table ROMs or RAMs and which convert a luminance signal into a density signal. A block 406 represents a well-known circuit for masking and under-color removal (UCR), in which each time a magenta (M) signal, a cyan (C) signal, a yellow (Y) signal or a black (Bk) signal to be output is read from three input signals, it is output as a signal having a predetermined bit length, e.g., of 8 per pixel bits formed in a surface-sequential manner.

A signal CNO is a two-bit surface sequential signal which is a control signal designating the order of four cycles of reading operation as shown in Table 1 to change operating conditions of the masking/UCR circuit 406.

TABLE 1

| CNO Signal | Print Output |
|---|---|
| 0 | Magenta (M) |
| 1 | Cyan (C) |
| 2 | Yellow (Y) |
| 3 | Black (Bk) |

A block 407 represents a spatial filter circuit which corrects spatial frequencies of an output signal. A block 408 represents a density converter circuit which compensates for density characteristics of the printer unit 202. The density conversion circuit 408 is constituted of ROMs or RAMs similar to those of the logarithmic converters 403 to 405.

A block 409 represents a judgment circuit which serves to discriminate specific originals. In this circuit, judgment is made as to whether at least one of a plurality of specific originals is being read, and a judgment signal H is output as "0" or "1". That is, H="1" is output if at least one of the plurality of specific originals is being read, and H="0" is output if none of them is being read.

The signal CNO is also input to the judgment circuit 409 to change the judgment criteria with respect to the four cycles of reading operation, so that the judgment circuit 409 can effect judgment with respect to different specific originals.

A block 410 represents an OR gate circuit which forms the logical OR of the 8-bit output V from the density conversion circuit 408 and the judgment signal H output from the judgment circuit 409 to output a signal V'.

If the judgment signal H="1" as a result of the judgment, that is, it is judged that at least one of the specific originals is being read, the output V'=FF/Hex(255) irrespective of the value of the input signal V. If the judgment signal H=0, that is, it is judged that none of the specific originals, the value of the input signal V is directly output as V'.

Conditions for the judgment of the judgment circuit 409 can be changed according to information from the card reader 228.

[Judgment Circuit]

Figure 3:
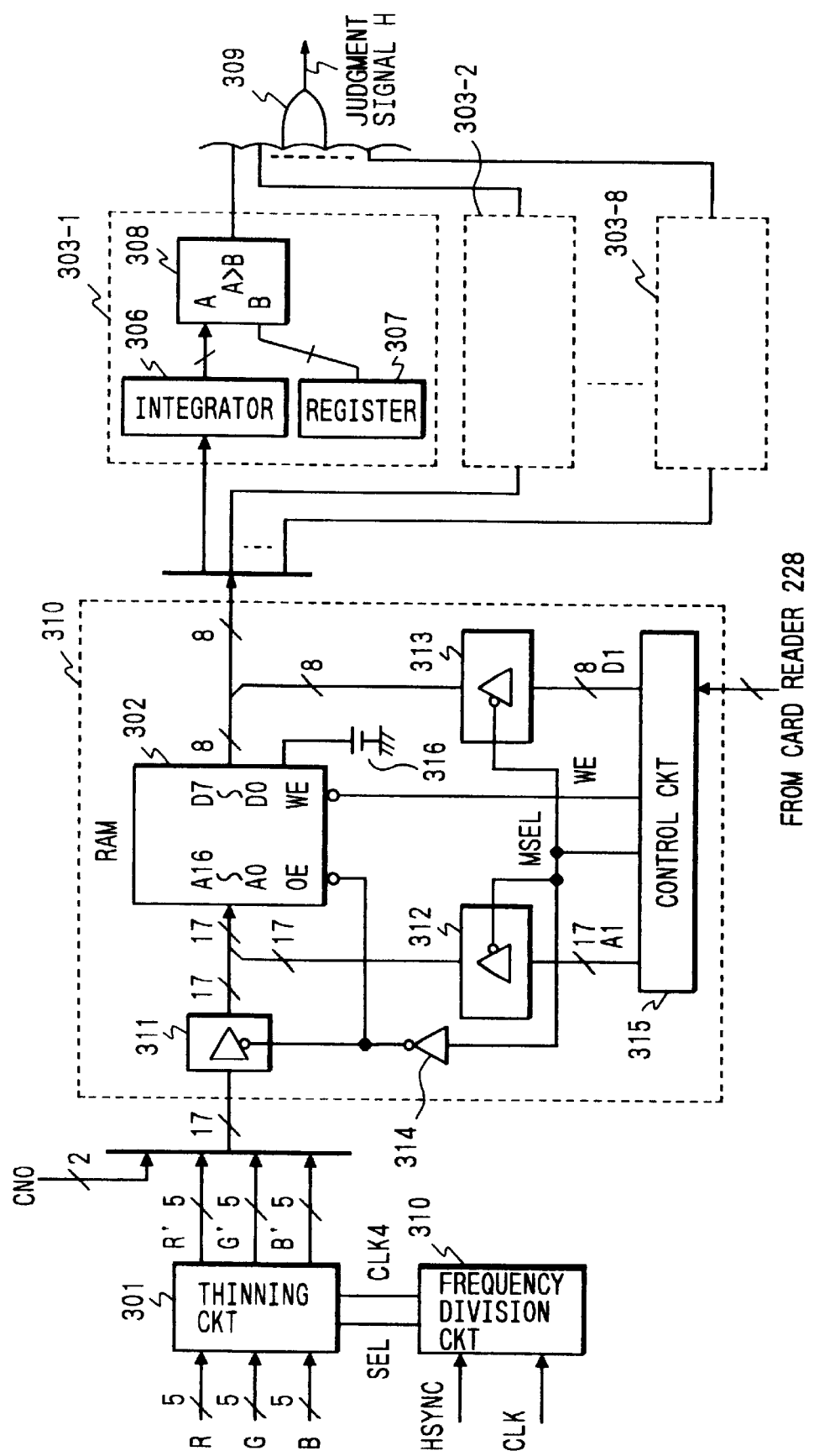
FIG. 3 is a block diagram of a judgment means.

FIG. 3 is a block diagram of the judgment circuit 409.

Figure 4A:
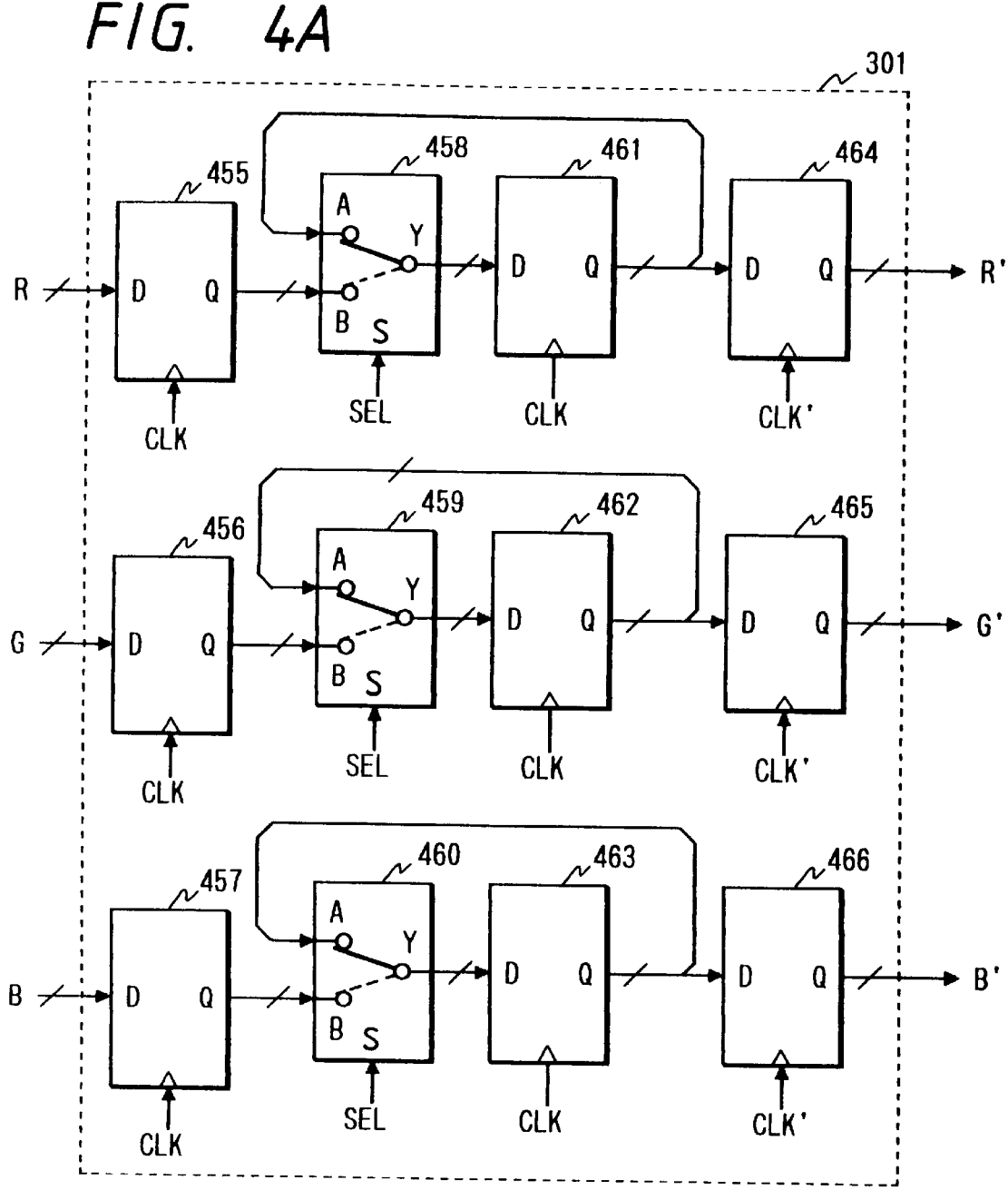
FIGS. 4A and 4B are block diagrams of a thinning-out circuit and a frequency divider circuit.

A block 301 represents a thinning-out circuit, such as that shown in FIG. 4A. The thinning-out circuit 301 thins out data to reduce the load on the processing section of the judgment circuit 409.

A block 310 represents a tint matching circuit which is formed of a tint look-up table RAM (programmable memory) 302, tri-state gates 311, 312, and 313, an inverter 314, a control circuit 315, and a battery 316 for maintaining the stored content of the RAM 302 irrespective of the on/off state of the power supply for the main system of the copying machine.

Data for tint matching with a plurality of kinds of specific originals is stored in the RAM 302. That is, tint distributions of 32 specific originals are previously examined, judgement is made as to whether the tint of each of pixels concerned matches the tint of the specific originals, and results of the judgment are stored in the RAM 302. The content of the RAM 302 is maintained by the battery 316 even when the power supply for the main system of the copying machine is cut.

The control circuit 315 outputs a signal MSEL and a signal WE as control signals to control read/write of the RAM 302 and to control the tri-state gates 311, 312, and 313. There are two control modes for the control of the control circuit 315:

① An ordinary control mode in which the RAM 302 operates as a look-up table; and ② a RAM rewrite control mode in which the data in the RAM 302 is rewritten.

In the ordinary control mode, the control circuit 315 fixes the signal MSEL to "1" to set the tri-state gate 311 in the enable state and the tri-state gates 312 and 131 in the disable state, thereby setting an OE (output enable) terminal of the RAM 302 to "0". Further, the control circuit 315 fixes the signal WE to "0" to set the RAM 302 in the data output enable state, so that the RAM 302 functions as a look-up table.

That is, the signal CNO which is a surface-sequential signal is input to upper 2 bits of each address in the RAM 302, and upper 5 bits of a thinned-out image signal of each of colors R, G, and B are input to lower 15 bits of the address. In this embodiment, judgment results according to signal CNO values 0 to 3 as to whether the tint of each pixel coincides with the tint of each of 8 kinds of specific originals are simultaneously output in correspondence with 8-bit data. Judgment is made with respect to the 32 specific originals in all by four cycles of read scanning. According to the present invention, the arrangement may alternatively such that the kind of original may be discriminated with respect to the 32 specific originals by one cycle of read scanning.

Blocks 303-1, 303-2, . . . , 303-8 represent tint judgment circuit constituted of the same hardware, i.e., each constituted of an integrator 306, a register 307 and a comparator 308. Each of the tint judgment circuits 303-1, 303-2, . . . , 303-8 judges whether the corresponding one of the specific originals exists in an input original.

A block 309 represents a logical OR circuit which outputs an output "1" as a judgment signal H if at least one of the outputs from the tint judgment circuits 303-1, 303-2, . . . , 303-8 indicates, as a judgment result, that the corresponding one of the specific originals exists.

In the RAM rewrite control mode, the control circuit 315 rewrites the RAM 302 based on data transferred from the card reader 228. That is, the control circuit 315 fixes the signal MSEL to "0" to set the tri-state gate 311 in the disable state and the tri-state gates 312 and 313 in the enable state. Further, the control circuit 315 generates, by the timing shown in FIG. 15, a signal AI designating addresses in the RAM 302, a data signal DI, and the signal WE applied to a WE (write enable) terminal of the RAM 302, thereby enabling rewrite of the stored content of the RAM 302.

The content of the RAM 302 once updated is maintained by the battery 316 independently of the power supply for main system of the copying machine. Even if the power supply for the main system is cut, the stored data is maintained until the next updating.

[Timing Chart]

Figure 6:
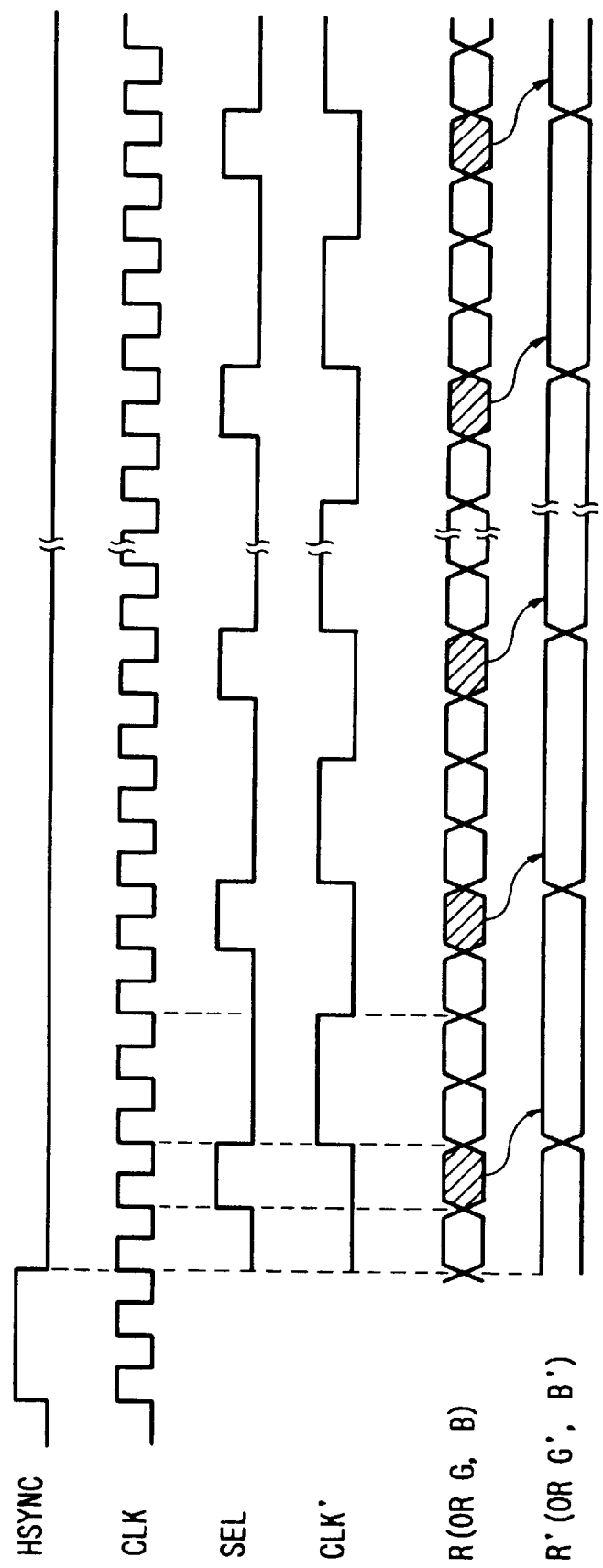
FIG. 6 is a timing chart.

FIG. 6 is a waveform diagram of main scanning timing in the ordinary control mode. A signal HSYNC is a main scanning sync signal for synchronization of the start of main scanning. A signal CLK represents an image transfer clock which is fundamental clock for various kinds of image processing in this embodiment.

A signal CLKT represents a clock which is obtained by demultiplying the frequency of the signal CLK to ¼ to be used as a fundamental clock for the judgment circuit 409. A signal SEL is a timing signal for use in the above-described thinning-out circuit 301. The signals CLK' and SEL are generated by a circuit, such as that shown in FIG. 4B, formed of an inverter 451, a 2-bit counter 452, an inverter 453, and an AND gate 454. The 2-bit counter 452 is cleared (initialized) by the signal HSYNC which is a main scanning sync signal, thereafter counts the signal CLK, and thereby outputs 2-bit count value (D0, D1). The upper bit D1 of this count value is output as signal CLK', and a logical product of an inverted signal of the lower bit D0 and the upper bit D1 is output as signal SEL.

Figure 4B:
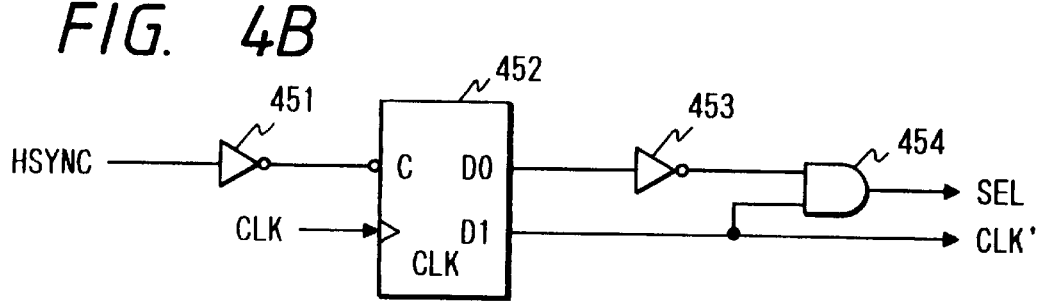

In the circuit shown in FIG. 4B, data is held based on the signal CLK.

The thinning-out circuit formed of flip flops 455, 456, 457, 461, 462, and 463, selectors 458, 459, and 460, and flip flops 464, 465, and 466 for holding data by CLK' signal thins out a signal R (G or B) transferred by the signal CLK at a rate of ¼ to obtain a signal R' synchronized with CLK', as shown in FIG. 6.

[Integrator]

Figure 5:
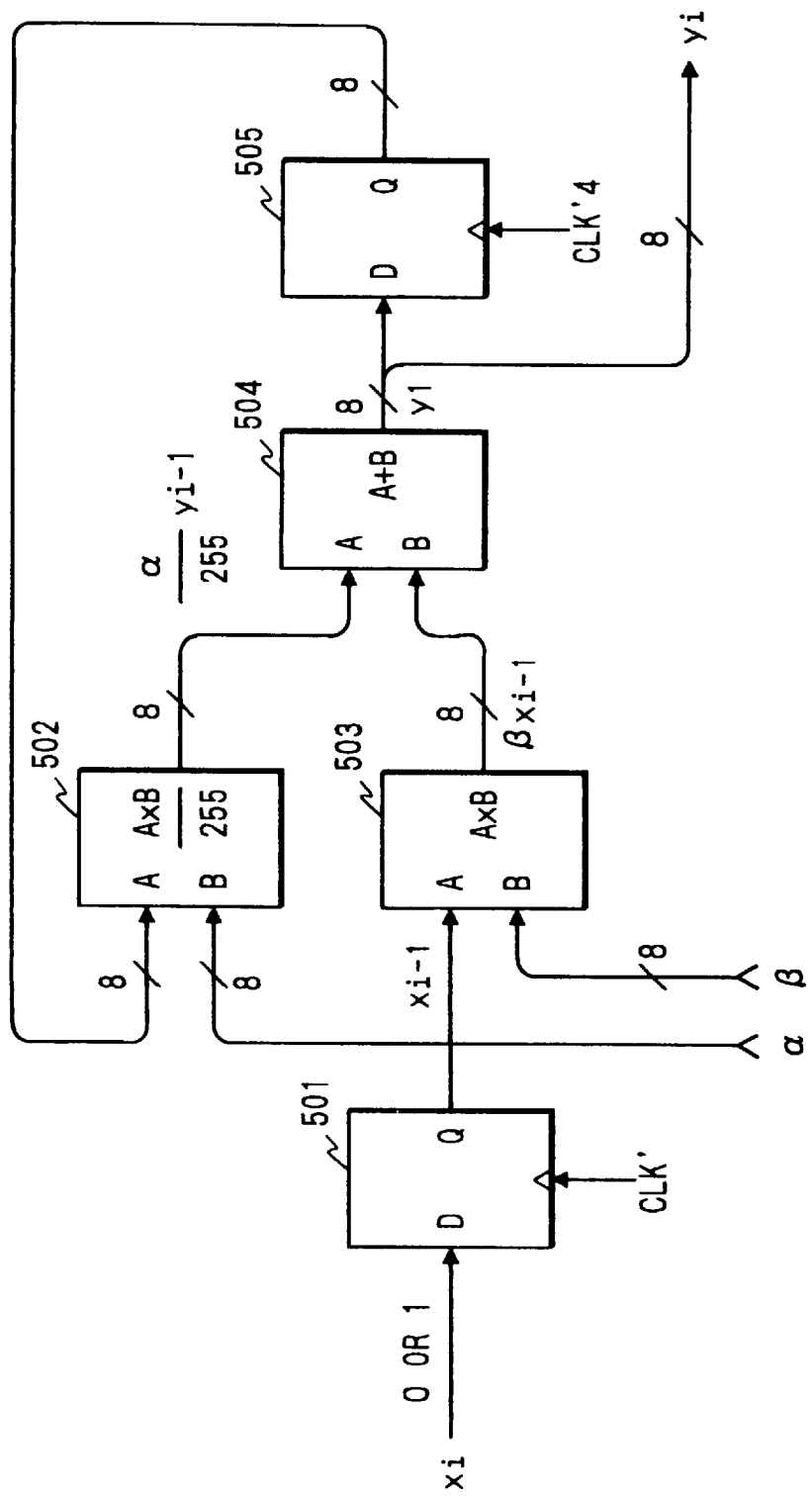
FIG. 5 is a block diagram of an integrator.

FIG. 5 is a block diagram of the integrator 306. Blocks 501 and 505 represent flip flops which hold data by the timing of each rise of CLK'.

A block 502 represents a multiplier which is supplied with two 8-bit input signals (A, B) and which outputs an 8-bit signal (A×B/255) as a multiplication result. A block 503 also represents a multiplier which is supplied with a 1-bit input signal (A) and an 8-bit input signal (B) and which outputs an 8-bit output signal (A×B) as a multiplication result.

A block 504 represents an adder which is supplied with two 8-bit input signals (A, B) and which outputs an 8-bit signal (A+B) as an addition result.

Consequently, in the operation of the integrator 306, an 8-bit signal yi with respect to a binary input signal xi is expressed by the following equation:

$$yi=(\alpha/255)yi-1+\beta xi-1$$

where $\alpha$ and $\beta$ are predetermined constants. Various characteristics of the integrator 306 are determined by these values.

For example, when $\alpha=247$ and $\beta=8$, an output yi, such as that shown in FIG. 7A, is output with respect to an input xi-1, such as that shown in FIG. 7B.

An input component, such as that indicated by a point 701 or 702, having a level "1" among other input components having level "0", or an input component, such as that indicated by a point 703, having a level "0" among other components having a level "1" can be regarded as noise. The input signal having such components is processed by the integrator while setting suitable threshold values, such as values indicated at 704, in the registers 307 shown in FIG. 3. The output yi from the integrator 306 is thereby two-valued to remove noise.

[Processing Result]

FIG. 8 shows an example of the result of processing in accordance with this embodiment. An original 801 shown in FIG. 8 contains, as a part of the image, a specific original 803 which should be discriminated by the copying machine. An output 802 is obtained as a result of copying with the copying machine. The portion corresponding to the specific original 803 is printed, for example, in magenta (M) when VNO=0, in cyan (C) when VNO=1, in yellow (Y) when VNO=2, or in black (Bk) when VNO=3, as indicated at 804. Consequently, the portion corresponding to the specific original 803 cannot be copied normally.

[Procedure of Updating RAM Data]

The data in RAM 302 should not be updated easily, because of its function. That is, if it can be easily updated, it may be changed with the intention of putting the machine to a bad use. In this embodiment, to avoid such a risk, a secret identifier (ID) is used which is input through an operation unit, while an IC card is inserted.

Figure 9:
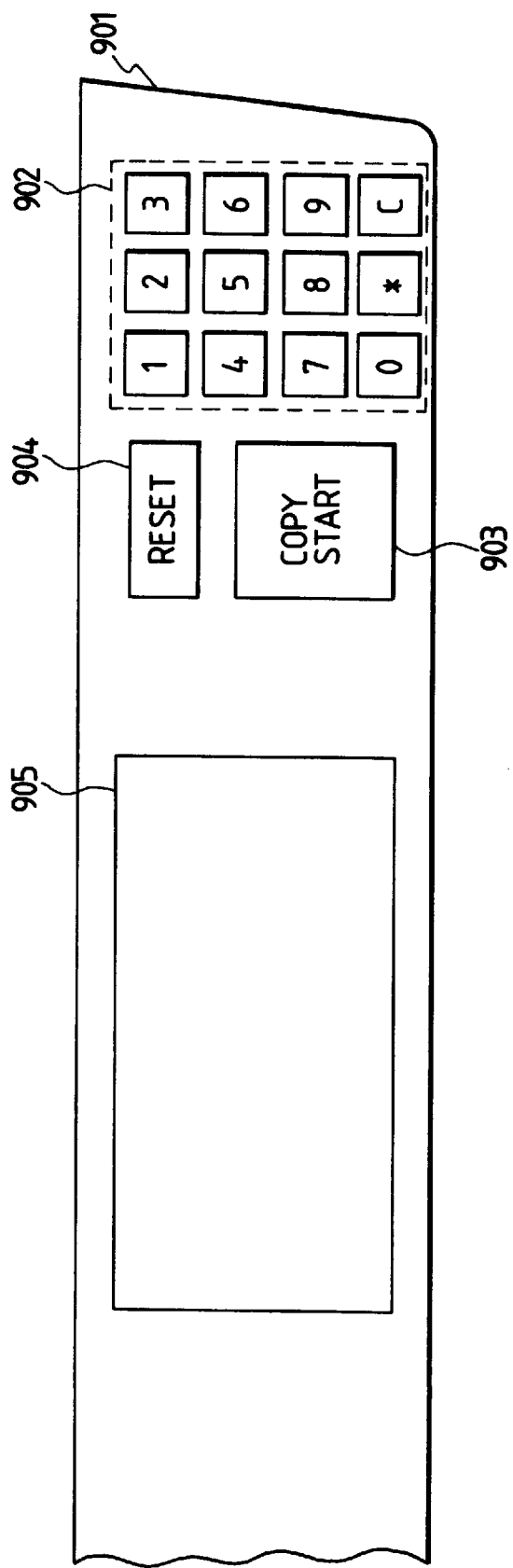
FIG. 9 is a diagram illustrating an operation unit in accordance with the first embodiment.

FIG. 9 shows the operation unit 901 of the copying machine of this embodiment. The operation unit 901 is disposed in a front face of the copying machine and has a ten key cluster 902, a copy start key 903 for starting the copying operation, a reset key 904 for initializing various set modes, and a liquid crystal display 905 with a touch panel for setting various modes.

An Identifier (ID) is input with the ten key cluster 902. That is, an identifier previously set, e.g., [*] [2] [0] [4] [2] [9] [C] [*] is input.

Figure 10:
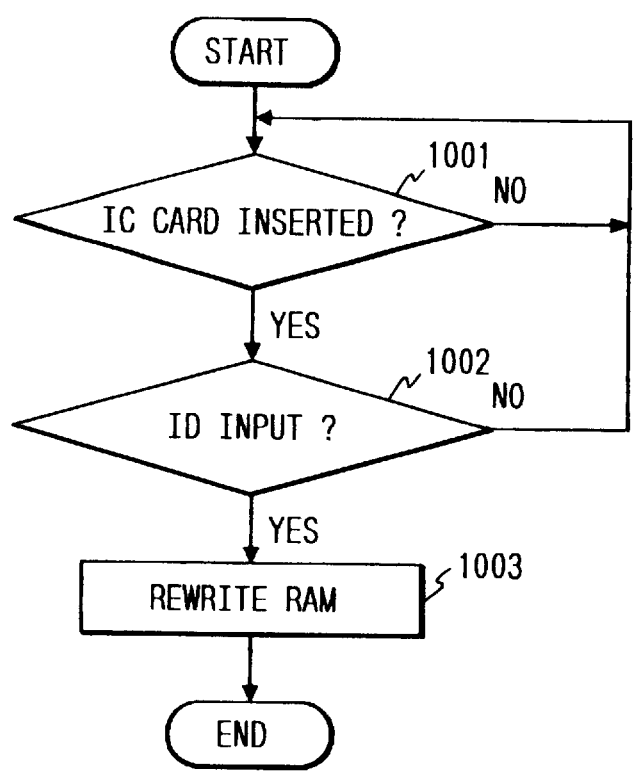
FIG. 10 is a flow chart of a process of updating held contents of a holding means.

FIG. 10 is a flow chart of a procedure of rewriting the RAM 302. In step 1001, determination is made as to whether the predetermined IC card has been inserted. If YES, the process proceeds to step 1002. In step 1002, determination is made as to whether the identifier has been correctly input. If NO, the process returns to the first step. Only when the identifier is correctly input, is the content of the RAM 302 updated, in step 1003.

[Second Embodiment]

With respect to the first embodiment, the RAM has been described as an example of a means for storing data of the features of specific originals, and the IC card has been described as an example of a means for inputting new data to update the stored data. However, these are not exclusively used. Any other mediums for data input/storage can be used. For example, an electrically erasable/programmable read only memory (EEPROM) or a flash ROM may be used as a data storage means, and a floppy disk, an optical disk, an opto-magnetic disk, a magnetic tape or the like may be used as a data input means.

[Third Embodiment]

A single-function copying machine has been described above as the first embodiment of the present invention. However, the present invention can also be applied to other kinds of apparatus.

Figure 12:
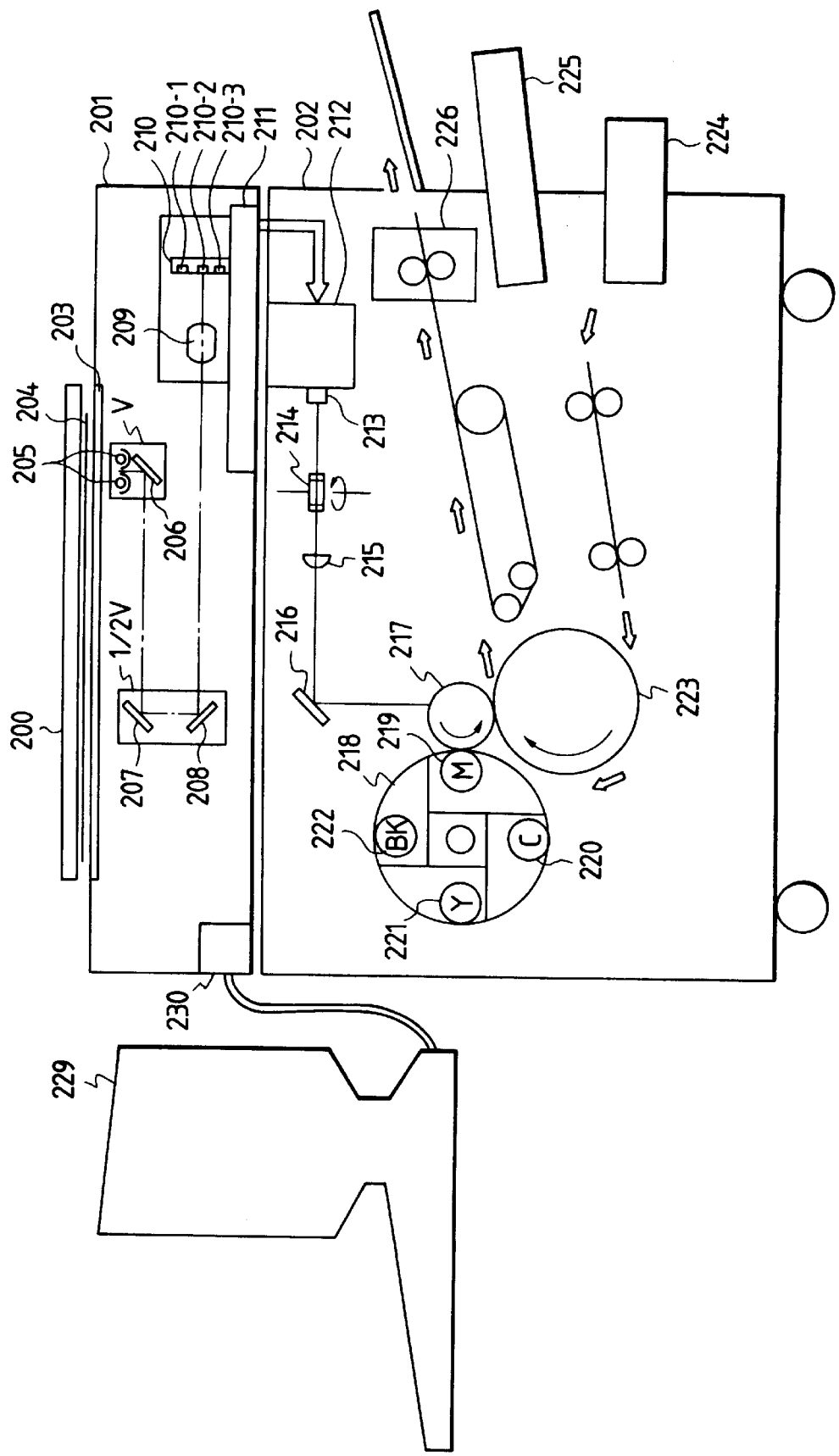
FIG. 12 is a diagram of the third embodiment.
Figure 13:
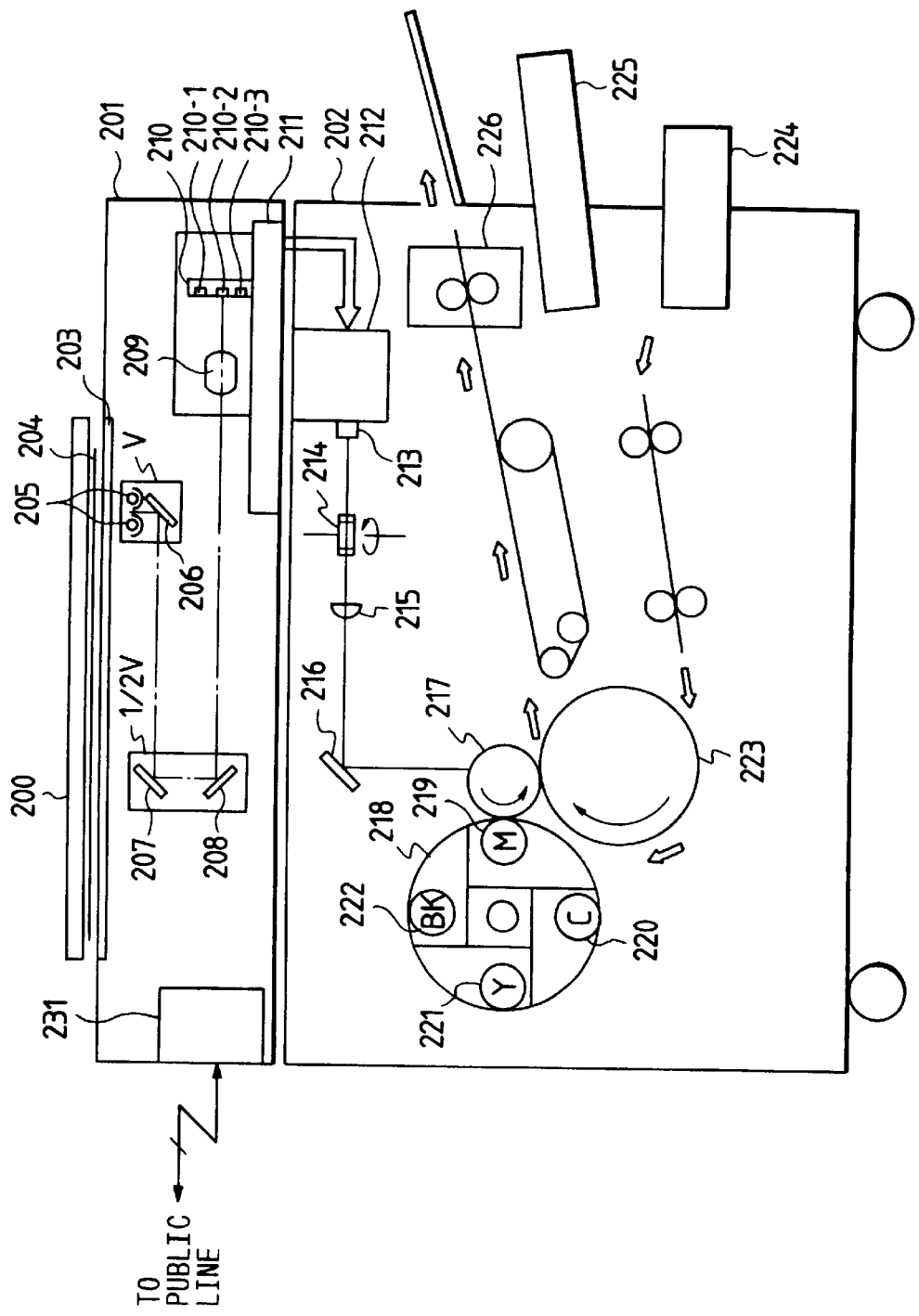
FIG. 13 is a diagram of a fourth embodiment of the present invention.

FIG. 12 schematically illustrates the third embodiment of the present invention. Components of this embodiment identical or corresponding to those shown in FIG. 2 are indicated by the same reference numerals, and the description for them will not be repeated.

A block 229 represents a host computer which is connected to the main unit through an interface 230. An image scanner unit 201 and a printer unit 202 function as a copying machine as in the case of the first embodiment, and they function as a terminal of the host computer 227. That is, an image read by the image scanner unit 201 can be sent to the host computer 229 to be processed, and image data sent from the host computer 229 can be output from the printer unit 202.

Figure 11:
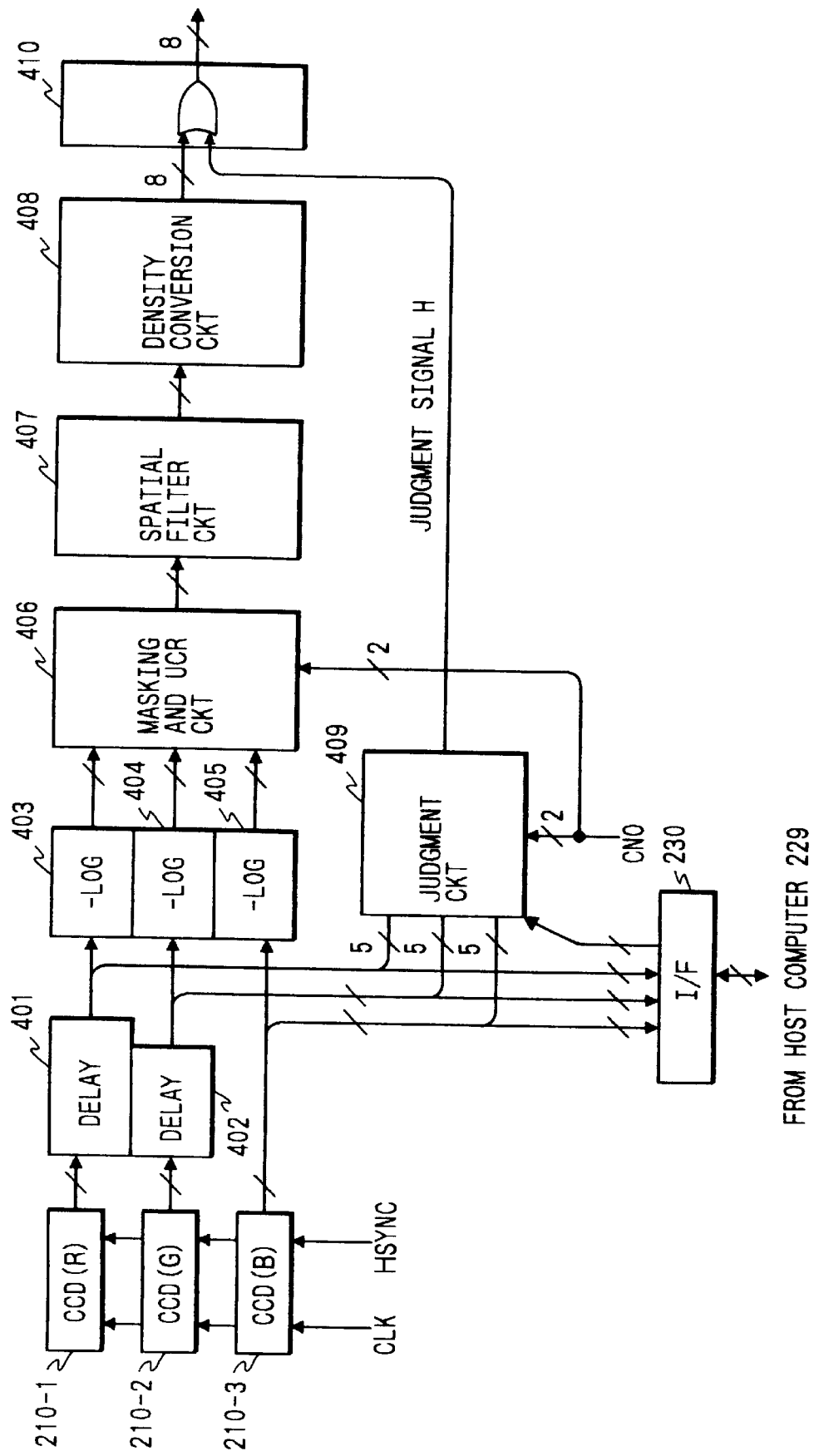
FIG. 11 is a diagram of a third embodiment of the present invention.

FIG. 11 is a block diagram of signal flow in the image scanner unit in accordance with the third embodiment. Components of this embodiment identical or corresponding to those shown in FIG. 1 are indicated by the same reference numerals, and the description for them will not be repeated.

A block 230 represents the interface circuit shown in FIG. 10. The interface circuit 230 serves for information communication with the host computer 229.

An image read with a CCD 210 can be set to the printer unit 202 as in the case of the first embodiment and can also be sent to the host computer 229 through the interface circuit 230. On the other hand, image data from the host computer 229 can be input to the printer unit 202 through the interface circuit 230 to be output. A judgment circuit 409 has the same function as that of the first embodiment. However, the judgment circuit 409 of this embodiment is characterized in that data for judgment, i.e., data on the features of specific originals can be updated through the interface circuit 230 by the host computer according to need.

[Fourth Embodiment]

FIG. 14 schematically illustrates the fourth embodiment of the present invention. Components of this embodiment identical or corresponding to those shown in FIG. 11 are indicated by the same reference numerals and the description for them will not be repeated.

A block 231 represents a modem circuit for connection between the machine and a public line. A judgment circuit 409 has the same function as that of the first embodiment. However, the judgment circuit 409 of this embodiment is characterized in that judgment data, i.e, data on the features of specific originals can be updated from the outside through the public line and the modem circuit 231 according to need.

In the above-described embodiments, the method of detecting color distributions of an object image in accordance with an algorithm of the judgment circuit, but it is not necessarly used exclusively. According to the present invention, other methods, e.g., one in which an object image is examined by pattern matching, may be used.

Also, processing according to the result of judgment, e.g., stopping the printing operation, is selected as desired.

In the embodiments of the present invention, as described above, various specific images can easily be discriminated.

[Fifth Embodiment]

The fifth embodiment of the present invention will be described below as another example of the copying machine to which the present invention is applied, but, needless to say, the present invention is not limited to it and can be applied to various image processors such as printers and facsimile machines.

Figure 25:
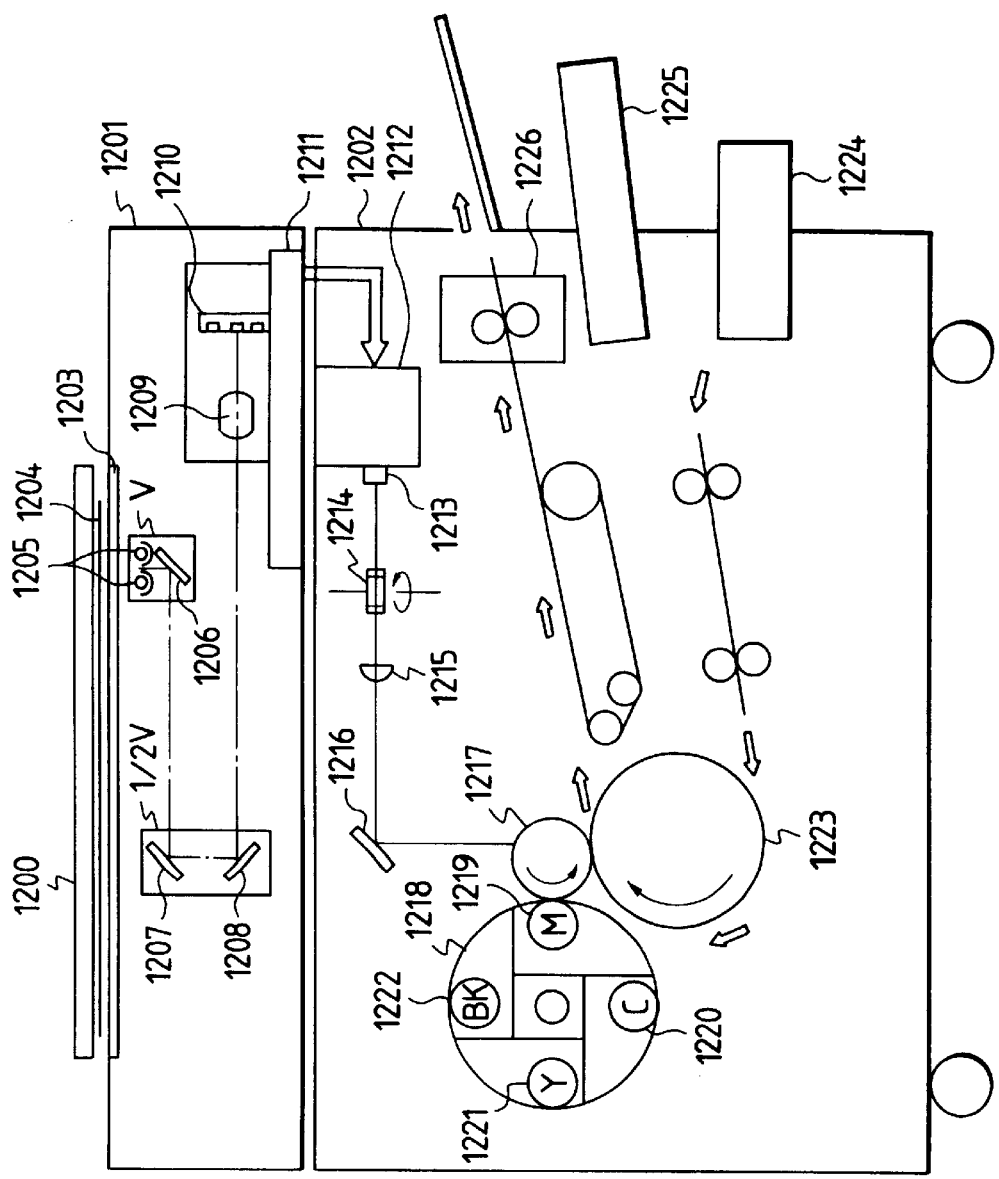
FIG. 25 is a diagram of an example of the color copying machine to which the present invention is applied.

FIG. 25 schematically illustrates a copying machine in accordance with the fifth embodiment of the present invention.

In FIG. 25, a block 1201 represents an image scanner unit which reads an original and performs digital signal processing. A block 1202 represents a printer unit which prints, on a paper sheet,. a full-color output image corresponding to an original image read by the image scanner 1201.

In the image scanner 1201, an original 1204 is placed on an original table glass (hereinafter referred to as a platen) 1203 while being pressed by a specular pressing plate 1200. The original 1204 on the platen 1203 is irradiated with a lamp 1205, and reflection light from the original travels via mirrors 1206, 1297, and 1208 to form an image on a three-line sensor (hereinafter referred to as a CCD) 1210 through a lens 1209. Full-color information having a red (R) component, a green (G) component and a blue (B) component is thereby obtained and is sent to a signal processing section 1211. The lamp 1205 and the mirror 1206 are mechanically moved at a speed v in a direction perpendicular to the direction of electrical scanning of the line sensor the main scanning direction) and the mirrors 1207 and 1208 are also mechanically moved at a speed ½ v in the same direction to scan the surface of the original (in the sub scanning direction). In the signal processing section 1211, the read image signal is electrically processed to be decomposed into a magenta (M) component, a cyan (C) component, a yellow (Y) component, and a black (Bk) component to be sent to the printer unit 1202. In one cycle of original scanning of the image scanner 1201, one of the components M, C, Y, and Bk is sent to the printer unit 1202. One print of the reproduced image is completed by four cycles of original scanning.

Each image signal M, C, Y or Bk sent from the image scanner unit 1201 is sent to a laser driver 1212. The laser driver 1212 drives a semiconductor laser device 1213 by modulating a driving signal. A surface of a sensitive drum 1217 is scanned with laser light from the laser device led by a polygonal mirror 1214, an f-θ lens 1215 and a mirror 1216.

A rotary development device 1218 has a magenta development section 1219, a cyan development section 1220, a yellow development section 1221 and a black development section 1222. These development sections are alternately brought into contact with the sensitive drum 1217 to develop, with a toner, an electrostatic latent image formed on the sensitive drum 1217.

A paper sheet supplied from a paper cassette 1224 or 1225 is wrapped around a transfer drum 1223, and the image developed on the sensitive drum 1217 is transferred to the paper sheet.

After four colors M, C, Y and Bk have been successively transferred in this manner, the print sheet is passed through a fixation unit 1226 and is discharged after the completion of fixation of the toner.

The image signal processing section 1211 in accordance with this embodiment will be described below.

Figure 16:
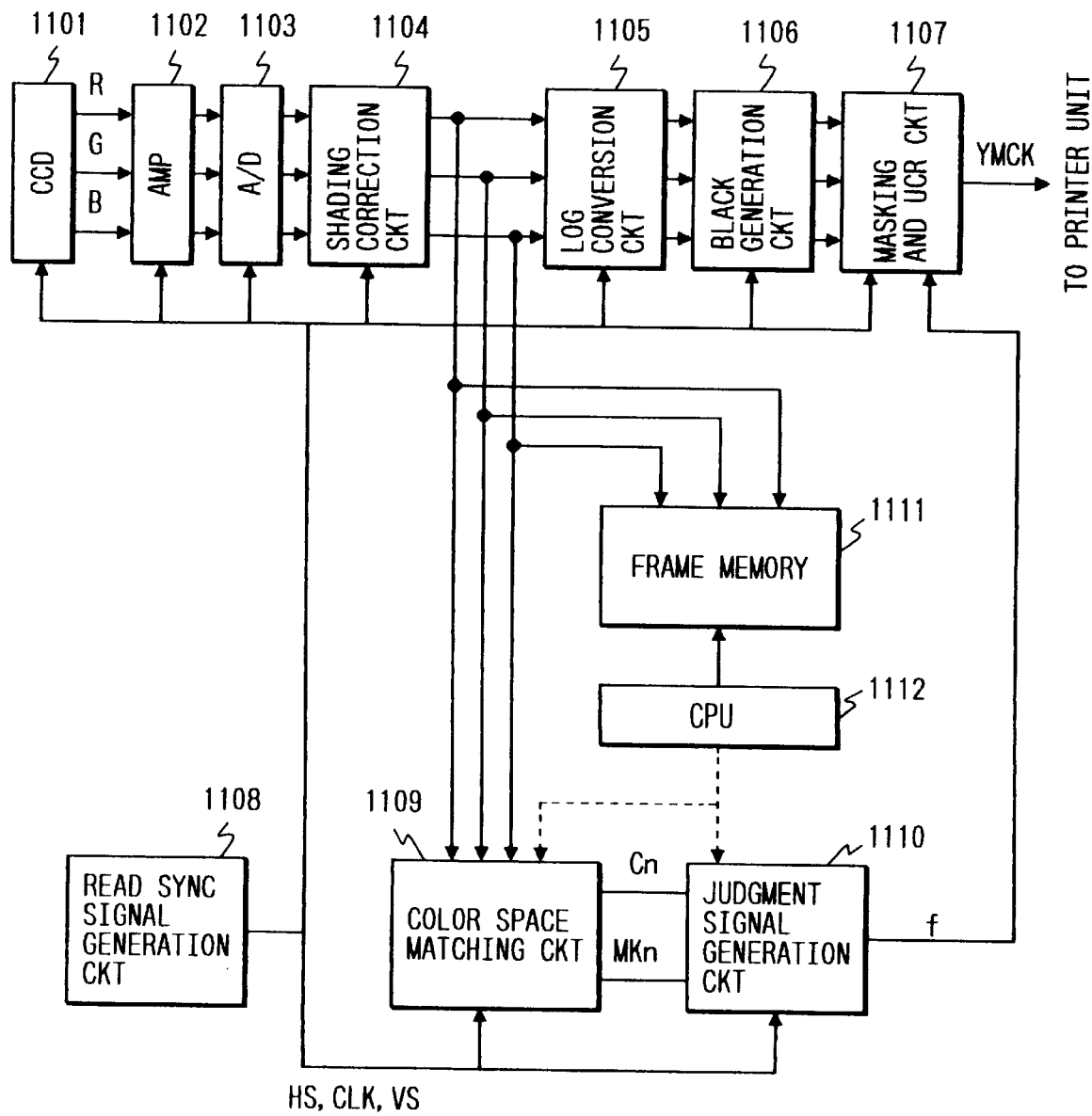
FIG. 16 is an overall block diagram of a color image processor in accordance with a fifth embodiment of the present invention.

FIG. 16 is a signal processing block diagram of the color image processor in accordance with this embodiment.

In FIG. 16, a block 1101 represents a CCD color sensor which reads an unillustrated color original with respect to lines and outputs read data to an analog amplifier 1102. A block 1103 represents an A/D converter which samples and holds an analog output from the amplifier 1102 and converts it into digital data. A block 1104 represents a shading correction circuit which serves to correct a luminance gradient of the image signal depending upon the reading position and sensitivity non-uniformity of the CCD.

A block 1105 represents a logarithmic conversion circuit for converting the RGB signal into an YMCK signal for a printer output by a well-known color correction processing. Blocks 1106 and 1107 represent a black component extraction circuit and a masking/UCR (under color removal) circuit, respectively.

A block 1108 represents a circuit for generating signals HS, CLK and VS which are read sync signals. All of these sync signals are supplied to all the circuit blocks. The signal HS is a main scanning period signal, the signal CLK is a pixel reading fundamental clock signal, and the signal VS is a period signal representing a sub scanning direction effective area.

A block 1109 represents a color space matching circuit for calculating the degree of similarity between read image data and specific originals in a color space in a real time manner. A block 1110 represents a judgment signal generation circuit which outputs "1" if it is judged that one of the specific originals exists as a result of the matching in the color spacing matching circuit 1110, or "0" if it is judged that none of the specific originals exists.

For example, a judgment signal output from the judgment signal generation circuit 1110 is input to the masking/UCR circuit 1107 to change a masking coefficient from an ordinary value so that the color reproducibility is deteriorated, that is, the quality of the result of a forging work is reduced.

A block 1111 represents a frame memory for storing one frame of an input original image, and a block 1112 represents a CPU which accesses data in the frame memory 1111, and which also writes data in the circuits 1109 and 1110. Details of the memory 1111 and the CPU 1112 will be described later.

Figure 17:
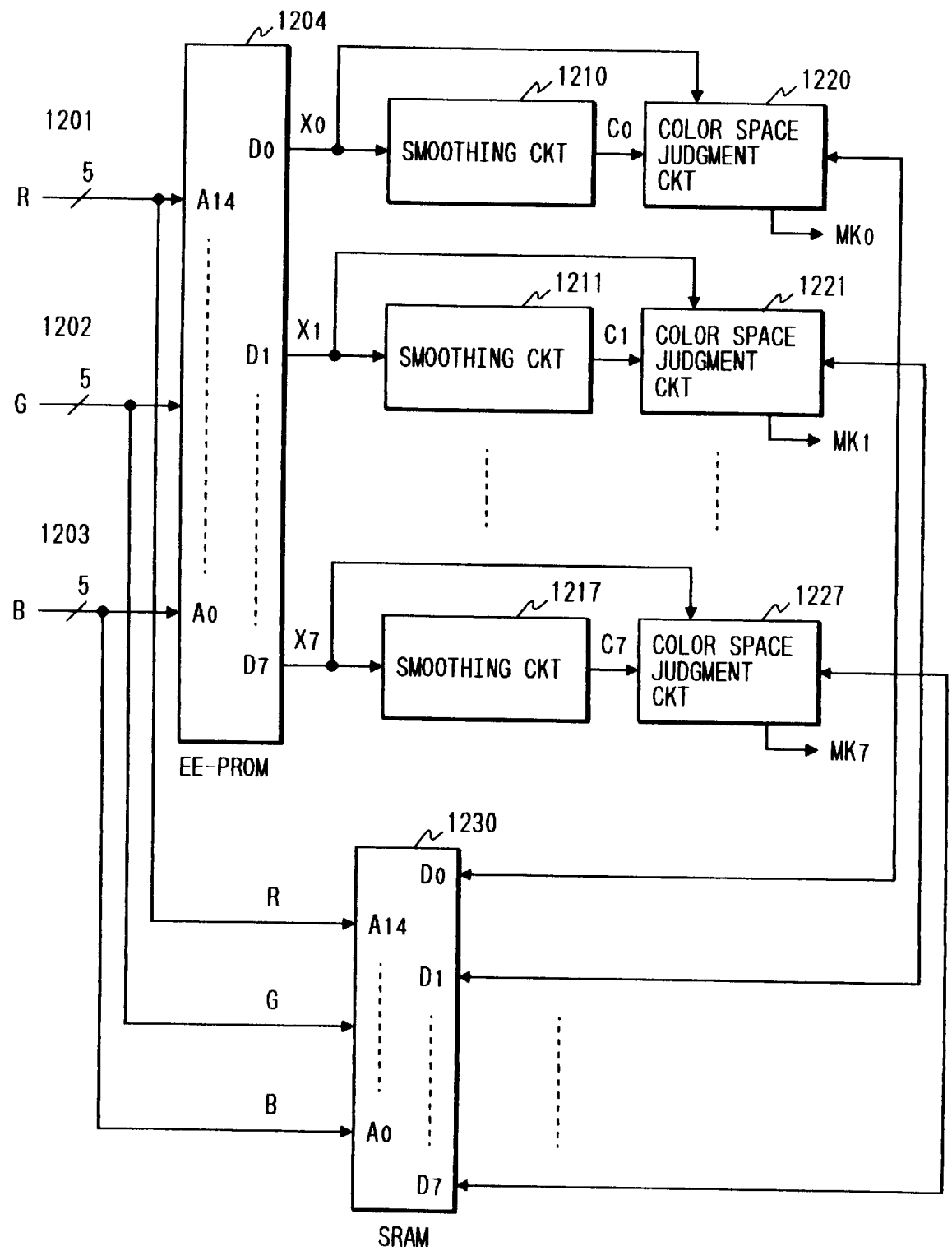
FIG. 17 is a diagram of color space matching judgment circuit 109.

FIG. 17 is a block diagram of the color space matching circuit 1109. Upper-5-bit data R1201 of an 8-bit red (R) signal is supplied from the shading correction circuit 1104. Also upper-5-bit data G1202 and B1203 of green (B) and blue (B) signals are supplied.

A block 1204 represents an EE-PROM (programmable/erasable memory) in which information on tints of a plurality of specific originals is stored. The above-mentioned R, G and B signals are input to addresses $A_0$ to $A_{14}$ of the EE-PROM 1204, and judgment signals each indicating the result of judgment as to whether the R, G and B signals coincide with the tint of each of the specific originals are output as data $D_0$ to $D_7$. Information on the tints of the specific originals is stored in the ROM 1204. From the ROM 204, "1" is output as one of $D_0$ to $D_7$ if the input R, G and B signals coincide with the tint of the corresponding one of the specific originals, or "0" is output in the case of non-coincidence.

Figure 19:
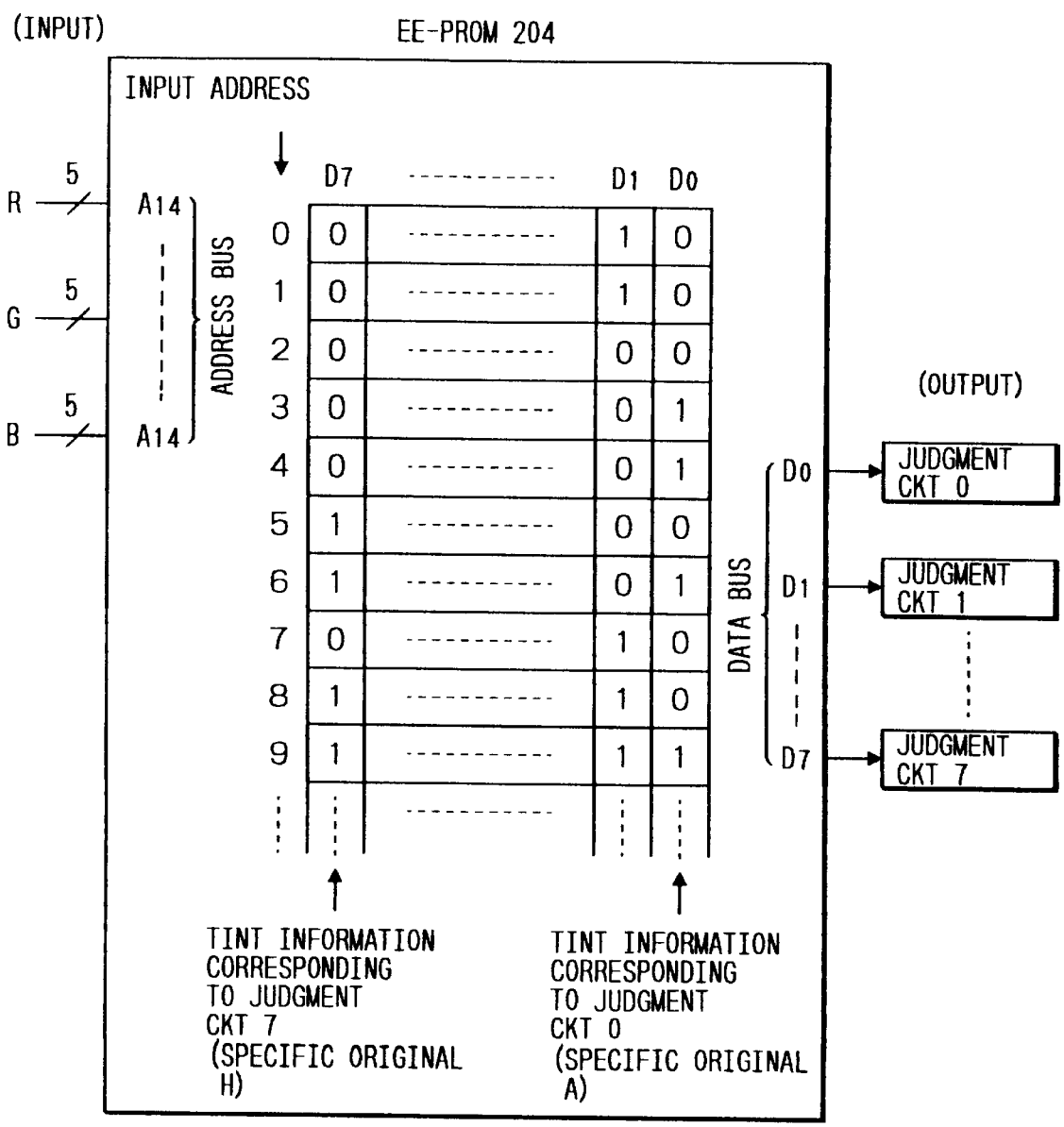
FIG. 19 is a diagram of the content of EE-PROM 204.

FIG. 19 is a diagram of the relationship between the data on the plurality of originals stored in the ROM 1204 and the bit positions in the ROM 1204. In accordance with this relationship, items of information (each consisting 0 or 1) on the judgment with respect to the tints of the 8 kinds of specific originals (specific originals A to H) are output in parallel as $D_0$ to $D_7$.

Figure 20:
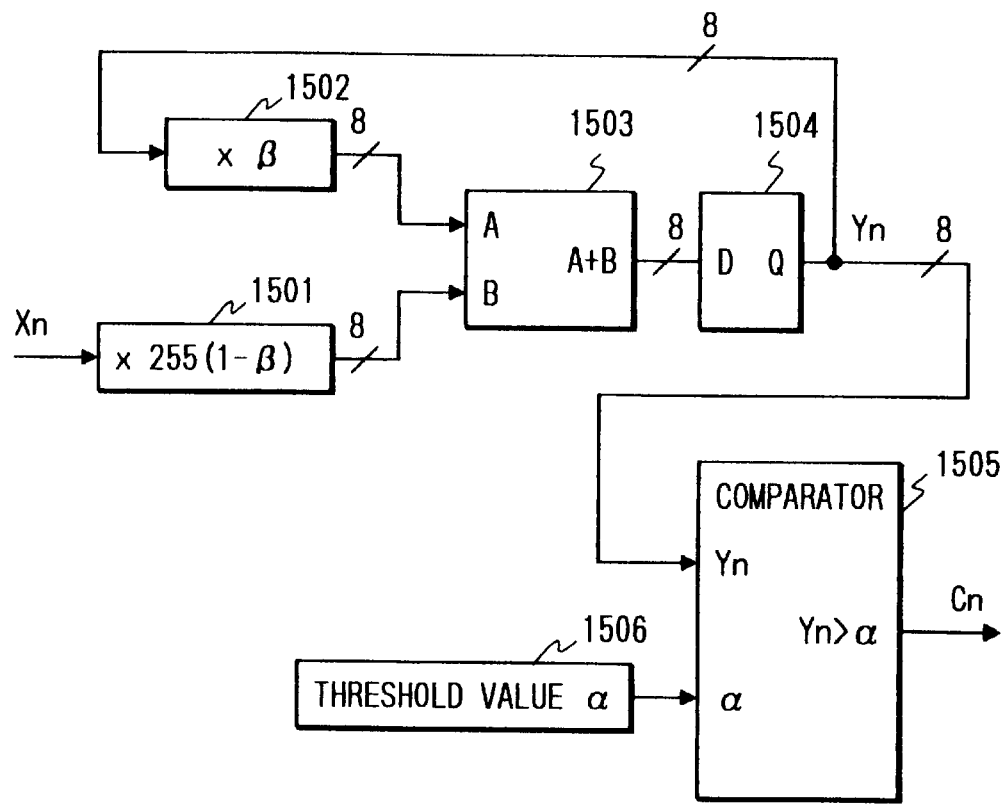
FIG. 20 is a block diagram of smoothing circuits 210 to 217.
Figure 21:
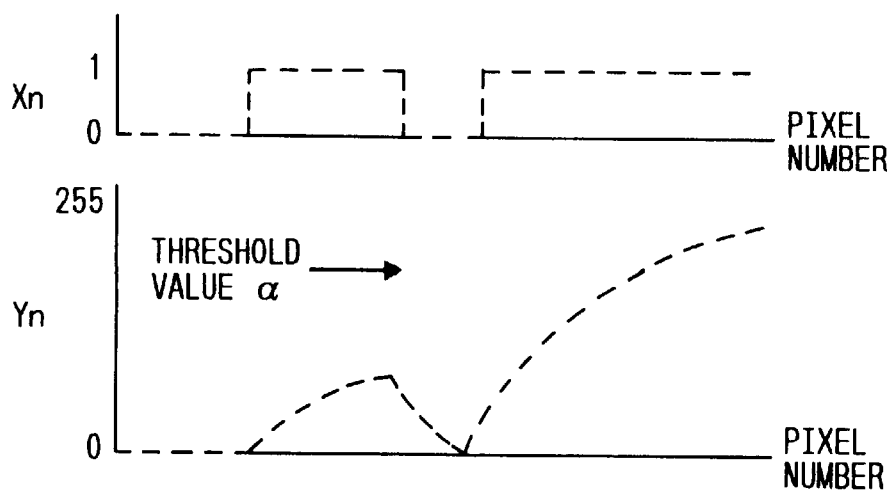
FIG. 21 is a diagram of the operation of the smoothing circuits.

Blocks 1210 to 1217 represent circuits for performing smoothing calculations of color judgment signals $X_0$ to $X_7$. as shown in FIGS. 20 and 21.

FIG. 20 is a block diagram of the arrangement of each of the smoothing circuits 1210 to 1217. FIG. 21 is a diagram of the relationship between an input Xn and an output value Yn obtained by smoothing. If input Xn continuously exhibits values "1", the value of Yn is increased. If Xn becomes "0", the value of Yn is gradually reduced.

By this operation, if the input R, G and B signals continuously match the tint of the specific original, Xn continuously exhibits values "1" and Yn increases until it exceeds a predetermined threshold value.

Each of outputs $C_0$ to $C_7$ from the smoothing circuits is obtained by changing Yn in a binary encoding manner based on the predetermined threshold value. Thus, "1" is output as each of $C_0$ to $C_7$ only in a case where pixels having the same tint as the corresponding specific original are sequential. The judgment accuracy is thereby improved.

Color space judgment circuits 1220 to 1227 are circuits which calculate the degree of similarity between the specific original data and the input color signal in the RGB color space in a real time manner, and which output similarity determination signals $MK_0$ to $MK_7$.

Figure 18:
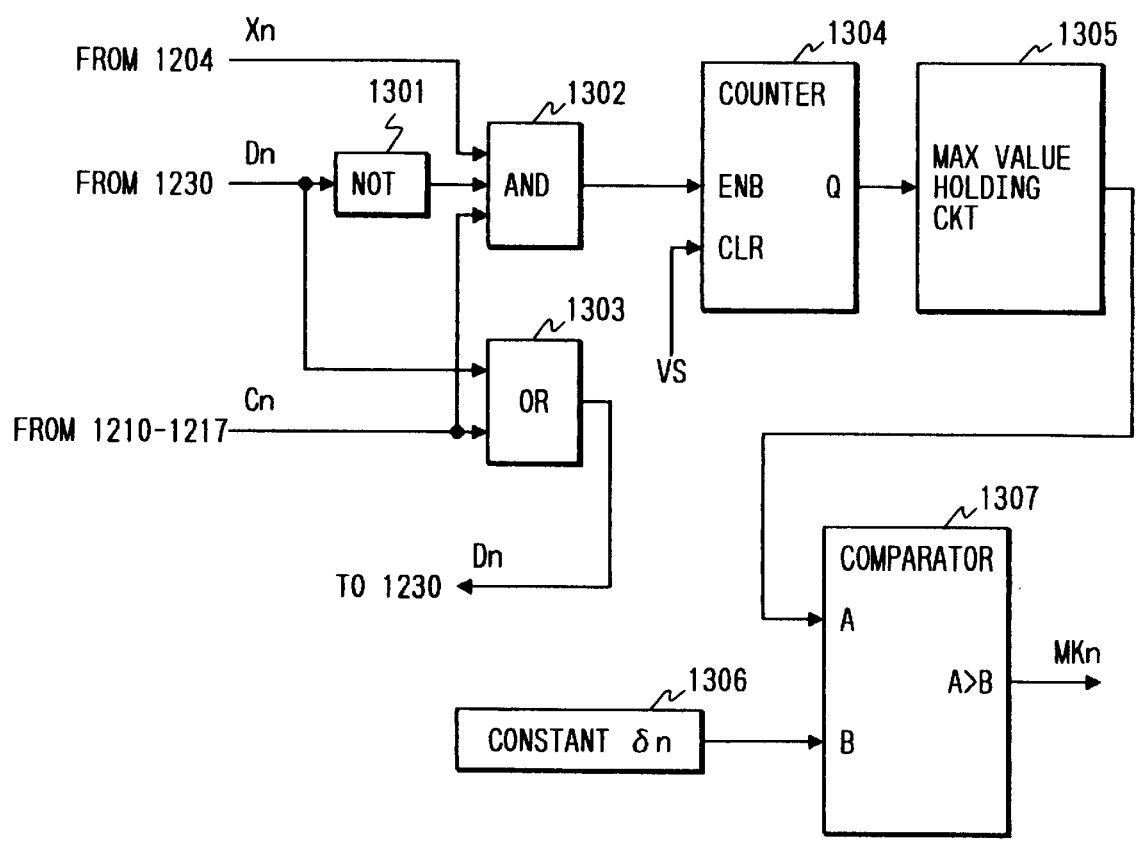
FIG. 18 is a diagram of color space judgment circuits 220 to 227.

FIG. 18 is a block diagram of each of the color space judgment circuits 1200 to 1227.

Data Dn from a SRAM 1230 and a signal Cn from the smoothing circuit are OR-calculated in a circuit 1303, and the calculation result is written as Dn in the SRAM 1230 again.

On the other hand, Dn, Cn and data Xn from the ROM 1204 are AND-calculated in a circuit 1302, and "1" is output from the circuit 1302 only when each of Xn and Cn is "1" and when Dn is changed from 0 to 1. When the output from the circuit 1302 is "1", a counter 1304 counts up the output. The counter 1304 is cleared at a rise of sub-scanning period signal VS.

A circuit 1305 serves to hold the maximum of the output value from the counter 1304. The maximum value of the counter output, which is output from the circuit 1305, is compared with a predetermined constant δn by a comparator 1307. If the maximum value is greater than δn, the comparator 1307 outputs "1" as MKn. If the maximum value is not greater than δn, the comparator 1307 outputs "0" as MKn. The value of δn is set as the value of S % in the volume occupied by the tint of the specific original in the color space. That is, if the number of "1" in the ROM 1204 shown in FIG. 19 is Vorg, $$\delta n = Vorg \times S/100$$

The value of S is set so that, assuming that the specific original is placed on the original table, the judgment signal MKn is "1" when about a half of the specific original is read.

Consequently, in this processing, each of the color space similarity judgment signal $MK_0$ to $MK_7$ becomes "1", when the input image data exhibits substantially the same shape as the specific original in the RGB three-dimensional color space.

Figure 22:
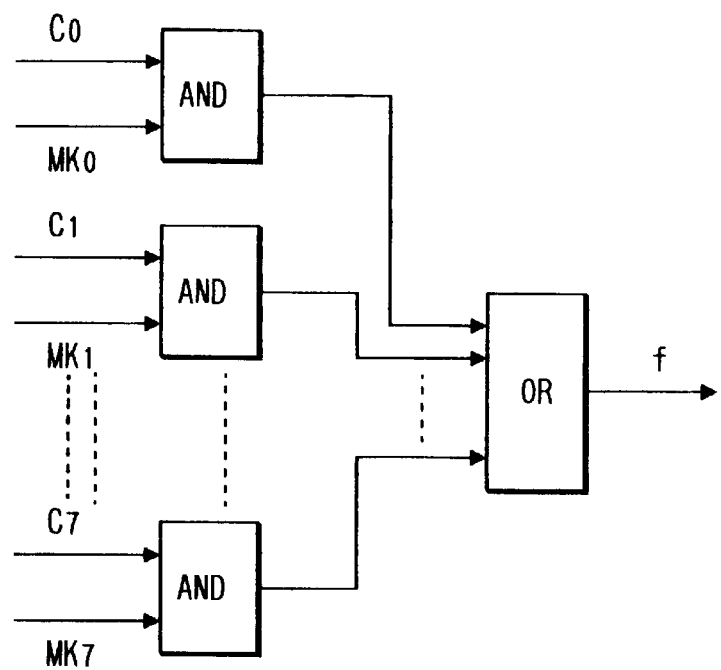
FIG. 22 is a circuit block diagram of judgment signal generation circuit 110.

FIG. 22 is a block diagram of the judgment signal generation circuit 1110. If it is determined by this circuit that at least one of the plurality of specific originals registered in the ROM 1204 coincides with the input image data in the color space, the judgment signal f becomes "1" in a real time manner to effect a feedback to the masking/UCR circuit.

The tint distribution data (in EE-PROM 1204 shown in FIG. 19) and the judgment threshold values (δn at 1306 in FIG. 18, α at 1506 in FIG. 17) necessary for the above-described processing in the specific original judgment circuit are determined by the CPU 1112 with reference to the image data in the frame memory 1111.

An example of this process will be described below with reference to FIG. 23.

Figure 23:
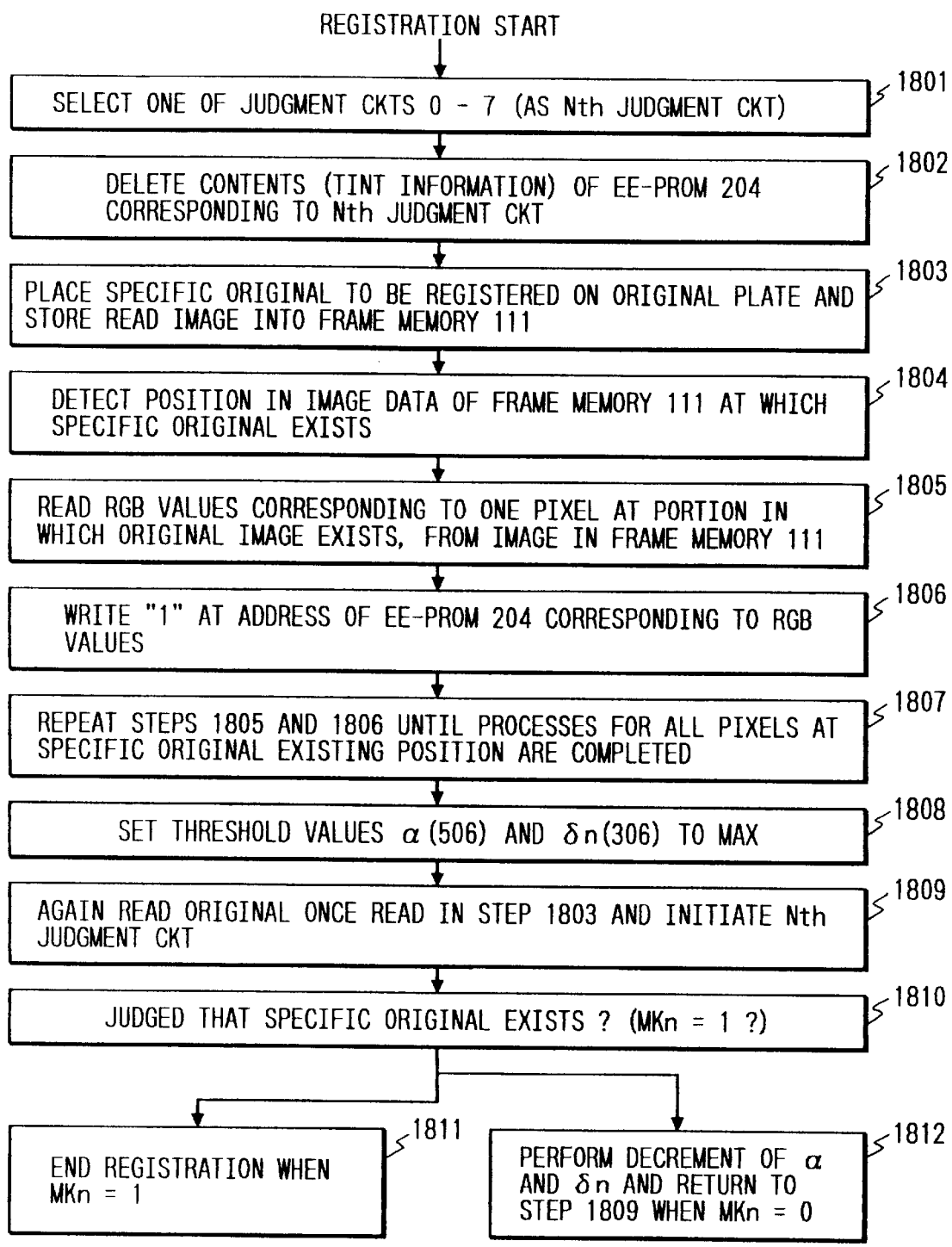
FIG. 23 is a flow chart of the processing in accordance with the present invention.

FIG. 23 is a flow chart of a process of registering a specific original.

In step 1801, one of the eight specific original judgment circuits shown in FIG. 17 is selected to set parameters for it. The selected number is set as N (0 to 7).

In step 1802, tint information corresponding to the Nth judgment circuit in the content of the EE-PROM 1204 shown in FIG. 19 is deleted.

In step 1803, the specific original to be registered is placed on the original plate of the image reader and is read by scanning, and the read data is stored as an RGB image data in the frame memory 1111. At this time, the input data may be stored by being thinned out, for example, every other 16 pixels, because the storage of all the data on the original image would require a very large frame memory capacity.

Figure 24:
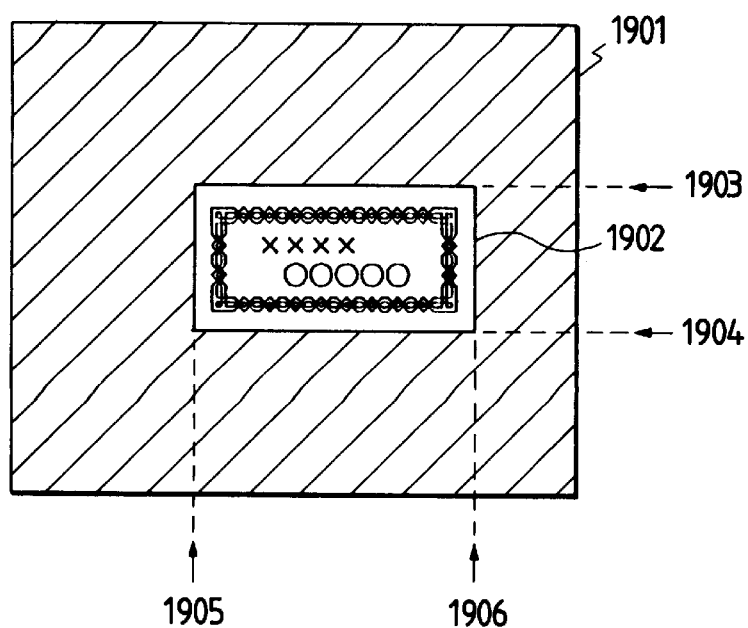
FIG. 24 is a diagram of detection of the position at which a specific original is detected.

In step 1804, the position at which the specific original exists in the image stored in the memory 1111. This is because the position on the original plate at which the original (e.g., a bank note, negotiable paper or the like) is placed is not previously determined, and because it is therefore uncertain which area in the frame memory contains significant data. FIG. 24 illustrates such a situation. A region 1901 corresponds to all the data in the frame memory, and a region 1902 represents the necessary portion corresponding to the specific original. If the background portion in the image of the data 1901 is dark, the position at which the specific original exists can be ascertained, for example, by detecting pixels having signal levels higher than a certain threshold value and by obtaining the minimum value (1903) and the maximum value (1904) in the longitudinal direction and the minimum value (1905) and the maximum value (1906) in the lateral direction of the pixels.

In step 1805, RGB data corresponding to one pixel in the region obtained in the preceding step, where the specific original exists, is read out of the memory 1111.

In step 1806, tint information with addresses corresponding to the RGB values read in step 1805 is written in the EE-PROM 1204. ("1" is written at addresses corresponding to the RGB values in the Nth column in FIG. 19.)

In step 1807, processing of steps 1805 and 1806 is repeated with respect to all the pixels in the data region 1902 shown in FIG. 24. When this processing is completed, the tint distribution of the specific original to be registered is registered in the EE-PROM.

In step 1808, the judgment threshold values α and δn for the Nth judgment circuit are set to the upper limit of the range in which they can be set (255 in this case).

In step 1809, the original image read in step 1803 is placed on the original plate again and is read again to operate the Nth judgment circuit. At this time, if the judgment threshold values set in step 1808 are suitable, it is necessary that the existence of the registered original is detected and that 11111 is output as the Nth judgment output MKn.

In step 1810, if MKn=1 is output in step 1809, it is determined that the set threshold values are suitable, and the registration process is terminated (step 1811).

If MKn=0, the threshold values are not suitable, the values of α and δn are therefore decremented by predetermined values, and the judgment step 1809 is performed again with respect to the same original (step 1812). This processing is repeated until MKn=1, thereby setting all the desired judgment parameters with respect to the specific original.

[Sixth Embodiment]

An example of the application of the present invention to a color copying machine has been described as the fifth embodiment. However, the arrangement may alternatively be such that original images are read to an external computer, the same processing is performed by this computer, and parameters thereby generated are written in an EE-PROM which is incorporated in the image processor of the present invention.

In the above-described embodiment, tint distribution information and judgment threshold values are used as judgment parameters. Needless to say, the present invention can be applied to a system for setting either one of these two categories of data or other judgment parameters.

According to the embodiments of the present invention, as described above, parameters of specific original judgment circuits can be easily set with respect to specific originals selected as desired. It is thereby possible to identify various kinds of specific originals.

Moreover, the present invention also ensures that judgment parameters can be selected so as to reflect variations of the judgment accuracy of color image processor units due to variations in device characteristics between the processors, thereby achieving constantly stable judgment.

In accordance with the present invention, as described above, data on specific originals to be discriminated can be registered.

The present invention is not limited to the above-described embodiments, and various modifications and changes of the invention and application of the invention to various apparatuses can be made without departing from the scope set forth in the appended claims.

What is claimed is:

1. An image processing method for forming, in a memory, a judgment standard to be used for judging whether an input object is a specific object, said method comprising the steps of:

inputting color image data corresponding to a color image with input means;

extracting color component data corresponding to the specific object from a selected part of the input color image data among the color image data; and forming a color distribution of the specific object in a selected part of the memory as the judgment standard, based on the extracted component data, wherein the selected part of the input color image data is included in a two-dimensional area on said color image.

2. A method according to claim 1, further comprising the step of storing a plurality of color distributions corresponding to a plurality of specific objects.

3. A method according to claim 1, wherein the input means is an image reading means for scanning an original and generating color image data.

4. A method according to claim 1, further comprising the step of storing the color image data input by the input means, into a frame memory.

5. A method according to claim 1, wherein the color component data is expressed by red, green and blue.

6. A method according to claim 1, further comprising the step of confirming the color distribution of the specific objected formed in the memory.

7. An image processing apparatus for forming, in a memory, a judgment standard to be used for judging whether an input object is a specific object, said apparatus comprising;

input means for inputting color image data corresponding to a color image;

means for extracting color component data corresponding to the specific object from a selected part of the input color image data among the color image data; and means for forming a color distribution of the specific object in a selected part of the memory as the judgment standard, based on the extracted component data, wherein, the selected part of the input color image data is included in a two-dimensional area on said color image.

8. An apparatus according to claim 7, wherein the memory stores a plurality of color distributions corresponding to a plurality of specific objects.

9. An apparatus according to claim 7, wherein said input means is an image reading means for scanning an original and generating color image data.

10. An apparatus according to claim 7, wherein the memory comprises a frame memory for storing the color image data input by said input means.

11. An apparatus according to claim 7, wherein the color component data is expressed by red, green and blue.

12. An apparatus according to claim 7, further comprising means for confirming the color distribution of the specific object formed in memory.

* * * * *

UNITED STATES PATENT AND TRADEMARK OFFICE
CERTIFICATE OF CORRECTION

PATENT NO. : 5,847,849

DATED : December 8, 1998

INVENTOR(S) : MASAHIRO FUNADA, ET AL.

It is certified that error appears in the above-identified patent and that said Letters Patent is hereby corrected as shown below:

COLUMN 1

Line 5, "continuation-in-part" should read --continuation--.
Line 24, "No. 351,165" should read --No. 351,165 and--.

COLUMN 2

Line 26, "comprising," should read --comprising--.

COLUMN 3

Line 48, "main" should read --"main--.
Line 49, "direction)" should read --direction")--.
Line 51, "sub scanning" should read --sub-scanning--.

COLUMN 4

Line 38, "8 per pixel bits" should read --8-bits per pixel--.

COLUMN 6

Line 33, "CLKT" should read --CLK'--.

UNITED STATES PATENT AND TRADEMARK OFFICE
CERTIFICATE OF CORRECTION

PATENT NO. : 5,847,849

DATED : December 8, 1998

INVENTOR(S) : MASAHIRO FUNADA, ET AL.

It is certified that error appears in the above-identified patent and that said Letters Patent is hereby corrected as shown below:

COLUMN 7

Line 2, "yi" should read --$y_i$--, and "xi" should read --$x_i$--.
Line 5, "yi=($\alpha$/255)yi-1+ßxi-1" should read --$y_i=(\alpha/255)y_{i-1}+\beta x_{i-1}$--.
Line 10, "yi," should read --$y_i$,--.
Line 12, "xi-1," should read --$x_{i-1}$,--.
Line 21, "yi" should read --$y_i$--.

COLUMN 9

Line 11, "sheet,." should read --sheet,--.
Line 26, "the" (first occurrence) should read --(the--.
Line 28, "sub" should read --sub---.

COLUMN 10

Line 9, "(under color" should read --(under-color--.
Line 16, "sub scanning" should read --sub-scanning--.
Line 40, "Also" should read --Also,--.

COLUMN 10

Line 51, "204," should read --1204,--.

UNITED STATES PATENT AND TRADEMARK OFFICE
CERTIFICATE OF CORRECTION

PATENT NO. : 5,847,849

DATED : December 8, 1998

INVENTOR(S) : MASAHIRO FUNADA, ET AL.

It is certified that error appears in the above-identified patent and that said Letters Patent is hereby corrected as shown below:

COLUMN 12

Line 53, "11111" should read --"1"--.

COLUMN 14

Line 13, "objected" should read --object--.
　　Line 17, "ing;" should read --ing:--.

Signed and Sealed this

Seventeenth Day of August, 1999

Attest:

Q. TODD DICKINSON

Attesting Officer

Acting Commissioner of Patents and Trademarks